US009458310B2

(12) United States Patent
Shirodkar et al.

(10) Patent No.: US 9,458,310 B2
(45) Date of Patent: Oct. 4, 2016

(54) MODIFIED POLYETHYLENE FILM COMPOSITIONS

(75) Inventors: Pradeep P. Shirodkar, Houston, TX (US); Jianya J. Cheng, Kingwood, TX (US); Andy H. Tsou, Allentown, PA (US); Pamela J. Wright, Easton, PA (US); Johannes M. Soulages, Morristown, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 508 days.

(21) Appl. No.: 13/584,137

(22) Filed: Aug. 13, 2012

(65) Prior Publication Data
US 2013/0211008 A1   Aug. 15, 2013

Related U.S. Application Data

(63) Continuation-in-part of application No. 12/904,428, filed on Oct. 14, 2010, now Pat. No. 8,604,136.

(60) Provisional application No. 61/279,127, filed on Oct. 16, 2009.

(51) Int. Cl.
*C08L 23/06* (2006.01)
*C08J 5/18* (2006.01)
*C08L 23/08* (2006.01)
*C08F 36/04* (2006.01)
*C08C 19/02* (2006.01)
*C08G 81/02* (2006.01)
*C08C 19/44* (2006.01)
*C08G 83/00* (2006.01)
*C08L 25/04* (2006.01)

(52) U.S. Cl.
CPC .......... *C08L 23/06* (2013.01); *C08C 19/02* (2013.01); *C08C 19/44* (2013.01); *C08F 36/04* (2013.01); *C08G 81/022* (2013.01); *C08G 83/003* (2013.01); *C08G 83/006* (2013.01); *C08J 5/18* (2013.01); *C08L 23/0815* (2013.01); *C08J 2323/06* (2013.01); *C08J 2400/202* (2013.01); *C08L 25/04* (2013.01)

(58) Field of Classification Search
CPC ........ C08L 23/04; C08L 23/06; C08L 23/08; C08L 23/0815; C08L 101/005; C08L 2205/06; C08J 5/18; C08J 2400/202; C08C 19/02; C08C 19/44; C08F 36/06; C08G 83/006
USPC ........................................ 525/209, 232, 240
See application file for complete search history.

(56) References Cited

U.S. PATENT DOCUMENTS

| 5,358,792 A | 10/1994 | Mehta et al. |
| 5,670,595 A | 9/1997 | Meka et al. |
| 5,932,157 A | 8/1999 | Dries et al. |
| 6,114,457 A | 9/2000 | Markel et al. |
| 6,147,180 A | 11/2000 | Markel et al. |
| 6,300,451 B1 | 10/2001 | Mehta et al. |
| 6,355,757 B2 | 3/2002 | Garcia-Franco et al. |
| 6,391,998 B1 | 5/2002 | Garcia-Franco et al. |
| 6,417,281 B1 | 7/2002 | Garcia-Franco et al. |
| 6,423,420 B1 | 7/2002 | Brant et al. |
| 6,509,431 B1 | 1/2003 | Duttweiler et al. |
| 6,673,870 B2 | 1/2004 | Owens et al. |
| 6,734,265 B1 | 5/2004 | Dekmezian et al. |
| 6,870,010 B1 | 3/2005 | Lue et al. |
| 7,687,580 B2 | 3/2010 | Lohse et al. |
| 2002/0182426 A1 | 12/2002 | Tanaka et al. |
| 2003/0050433 A1 | 3/2003 | Agarwal et al. |
| 2003/0220450 A1 | 11/2003 | Dillon et al. |
| 2004/0260035 A1 | 12/2004 | Dairanieh et al. |
| 2007/0135583 A1* | 6/2007 | Lohse et al. ............... 525/331.9 |
| 2007/0260016 A1 | 11/2007 | Best et al. |
| 2008/0038533 A1* | 2/2008 | Best et al. .................... 428/220 |
| 2009/0068429 A1* | 3/2009 | Kmiec et al. ................ 428/218 |
| 2010/0076128 A1 | 3/2010 | Abhari et al. |
| 2011/0118420 A1 | 5/2011 | Lohse et al. |
| 2011/0136982 A1 | 6/2011 | Tse et al. |
| 2012/0157633 A1* | 6/2012 | Lohse et al. .................. 525/193 |

FOREIGN PATENT DOCUMENTS

| EP | 0 533 493 | 3/1993 |
| EP | 1 066 957 | 1/2001 |
| WO | WO 91/15365 | 10/1991 |
| WO | WO 99/07788 | 2/1999 |
| WO | WO 00/01766 | 1/2000 |
| WO | WO 00/69963 | 11/2000 |
| WO | WO 03/040202 | 5/2003 |
| WO | 2012/158867 | 11/2012 |

OTHER PUBLICATIONS

Burfield, David R. et al., "DSC Studies of Tactic Polypropylenes: The Correlation of Polymer Stereochemistry with Thermal Properties", J. App. Pol. Sci., 1990, vol. 41, pp. 1095-1114.
ASTM D1003.
Polypropylene: The Definitive User's Guide and Data Book, Plastics Design Library, 1998, pp. 559, 123, 143 (ISBN 1-884207-58-8).
ExxonMobil Exceed 350D60 LDPE/Hexene Tough Premium Film Resin, Datasheet, www.matweb.com, 2013.
Shoulberg, R. H. et al., "Stress Whitening of Polymer Blends as a Tool for Experimental Stress Analysis", Exp. Mechanics, Sep. 1962, pp. 271-273.
Liu, Yan et al., "Characterization of Stress-Whitening of Tensile Yielded Isotactic Polypropylene", Polymer, 1997, vol. 38, No. 11, pp. 2797-2805.

(Continued)

*Primary Examiner* — Roberto Rabago

(57) ABSTRACT

The present invention relates to polyethylene compositions comprising one or more ethylene polymers and one or more dendritic hydrocarbon polymer modifiers, in particular, this invention further relates to polyethylene blends comprising one or more ethylene polymers and one or more dendritic hydrocarbon polymer modifiers, wherein the modifier has: 1) a g' value less than 0.75; 2) a Cayley tree topology with a layer number of 2 or more more; and 3) a average Mw between the branch points of 1,500 g/mol or more.

22 Claims, 4 Drawing Sheets

(56) References Cited

OTHER PUBLICATIONS

Hong, Y et al., "Film blowing of linear low-density polyethylene blended with a novel hyperbranched polymer processing aid," Polymer, Elsevier Science Publishers B.V., GB, vol. 41, No. 21, Oct. 1, 2000, pp. 7705-7713.

Hong et al., *Film Blowing of Linear Low-Density Polyethylene Blended With a Novel Hyperbranched Polymer Processing Aid*, Polymer, Elsevier Science Publishers B.V., GB, 2000, vol. 41, No. 21, pp. 7705-7713.

U.S. Appl. No. 61/538,703, filed Sep. 23, 2011, Jiang et al.

U.S. Appl. No. 13/302,446, filed Nov. 22, 2011, Yang et al.

Guzman, et al., *Simple Model to Predict Gel Formation in Olefin-Diene Copolymerizations Catalyzed by Constrained-Geometry Complexes*, AIChE Journal, May 2010, vol. 56, No. 5, pp. 1325-1333.

Patil et al., *Rheology of Polyethylenes with Novel Branching Topology Synthesized by a Chain Walking Catalyst*, Macromolecules, 2005, vol. 38, No. 25, pp. 10571-10579.

\* cited by examiner

Figure 1: Strain hardening behavior for B2, B3, B4, B5, and B1.

Figure 2: Complex viscosity values of B1, B2, B3, B4 and B5.

A Cayley tree with a layer number of 3

(using a tri-functional connector and roughly equal-length linkers)

MODIFIED POLYETHYLENE FILM COMPOSITIONS

PRIORITY CLAIM

For purpose of the United States, this application is a continuation-in-part of U.S. Ser. No. 12/904,428, filed Oct. 14, 2010, now U.S. Pat. No. 8,604,136, published as U.S. 2011/0118420, which claims priority to and the benefit of 61/279,127, filed Oct. 16, 2009.

STATEMENT OF RELATED APPLICATIONS

This invention is related to U.S. Ser. No. 61/538,703, filed Sep. 23, 2011 and U.S. Ser. No. 13/584,284, now U.S. Pat. No. 8,629,217, which is a continuation-in-part of U.S. Ser. No. 13/302,446, filed Nov. 22, 2011, now U.S. Pat. No. 8,487,059, which is incorporated by reference herein.

FIELD OF THE INVENTION

The present invention relates to branched modifiers, polyethylene compositions comprising an ethylene based polymer, and a branched modifier and films thereof.

BACKGROUND OF THE INVENTION

For many polyolefin applications, including films and fibers, increased melt strength and good optical properties are desirable attributes. A higher melt strength allows fabricators to run their blown film lines at a faster rate. It also allows them to handle thicker films in applications such as geomembranes.

Typical metallocene catalyzed polyethylenes (mPE) are somewhat more difficult to process than low-density polyethylenes (LDPE) made in a high-pressure polymerization process. Generally, mPEs (which tend to have narrow molecular weight distributions and low levels of branching) require more motor power and produce higher extruder pressures to match the extrusion rate of LDPEs. Typical mPEs also have lower melt strength which, for example, adversely affects bubble stability during blown film extrusion, and they are prone to melt fracture at commercial shear rates. On the other hand, mPEs exhibit superior physical properties as compared to LDPEs. In the past, various levels of LDPE have been blended with the mPE to increase melt strength, to increase shear sensitivity, i.e., to increase flow at commercial shear rates in extruders; and to reduce the tendency to melt fracture. However, these blends generally have poor mechanical properties as compared with neat mPE. It has been a challenge to improve mPEs processability without sacrificing physical properties.

US 2007/0260016 discloses blends of linear low density polyethylene copolymers with other linear low density polyethylenes or very low density, low density, medium density, high density, and differentiated polyethylenes, as well as articles produced therefrom.

U.S. Pat. No. 6,300,451 discloses ethylene/butene/1,9-decadiene copolymers, and ethylene hexene vinyl norbornene copolymers (see Tables I and II). The decadiene terpolymers disclosed are designed to be used alone and not in blends for improved processability/property balance. The relatively high MI of the resins suggests that they would not be suitable in blends which exhibit improved extensional strain hardening.

Patil, et al., "Rheology of Polyethylenes with Novel Branching Topology Synthesized by Chain Walking Catalyst" Macromolecules, 2005, 38, pp. 10571-10579 discloses dendritic PE produced from chain walking catalyst. The dendritic PE prepared by chain walking catalysts has extensive short and long chain branches with combined branch density of greater than 100 branches per 1000 carbon. The extensive short chain branching leads to amorphous polymers which have limited use in mixtures with semicrystalline polyethylene resins of commercial interest. Additionally, these polymers are prepared at low temperatures and extremely low pressures, both conditions that are not commercially attractive. Additionally, blends are not disclosed in this paper and there is no mention of blown film compositions.

U.S. Pat. No. 6,870,010 discloses blown films with improved optical properties produced from blends of linear metallocene PE with high MW HDPE. While the optical properties as measured by haze are improved over unblended film composition, the mechanical properties as measured by Dart Impact suffer a significant deterioration.

US 2011/0118420 discloses dendritic hydrocarbon polymer and process for the production thereof. US 2011/0118420 also states in the background section, that " . . . [w]hile LCB technology has been a part of the polyethylene industry since the 1930's, there is still a need to further optimize the type and availability of LCB polyethylenes and other polymers. A useful, inexpensive blend additive in the form of a LCB polymer could significant impact the processing/performance balance for polyethylenes, particularly the multi-billion dollar market for polyethylene films and molded articles. There could be even greater use in polypropylene, where there is currently little commercially viable technology for incorporating LCB. There is also a need for LCB polymers in the EPDM elastomer market."

Other references of interest include: Guzman, et al. AIChE Journal May 2010, vol. 56, No 5, pg. 1325-1333; U.S. Pat. Nos. 5,670,595; 6,509,431; 6,870,010; 7,687,580; 6,355,757; 6,391,998; 6,417,281; 6,114,457; 6,734,265; and 6,147,180.

We have discovered that certain branched hydrocarbon modifiers will advantageously improve processability of polyethylene without significantly impacting its mechanical properties. Moreover, addition of these branched hydrocarbon modifiers provides a means to change such properties on a continuous scale, based on real-time needs, which is typically not possible due to the availability of only discrete polyethylene grades. Furthermore, a different set of relationships between processability and properties is obtained, compared to those available from traditional polyethylenes and their blends with conventional LDPE, which allows for new and advantageous properties of the fabricated articles.

More particularly, the present invention relates to polyethylene compositions having improved properties such as melt strength or extensional strain hardening, without substantial loss in blown film, dart impact, MD tear, or other mechanical properties. Additionally, the films produced from these compositions exhibit surprisingly excellent optical properties as measured by lower film haze.

SUMMARY OF THE INVENTION

This invention relates to polyethylene compositions comprising one or more ethylene polymers and one or more dendritic hydrocarbon polymer modifiers.

This invention further relates to polyethylene blends comprising one or more ethylene polymers and one or more dendritic hydrocarbon polymer modifiers, wherein the modifier has: 1) a $g'_{vis}$ value less than 0.75; 2) a Cayley tree topology with a layer number of 2 or more; and 3) optionally, an average Mw between the branch points of 1,500 g/mol or more.

DEFINITIONS

Figure 1:
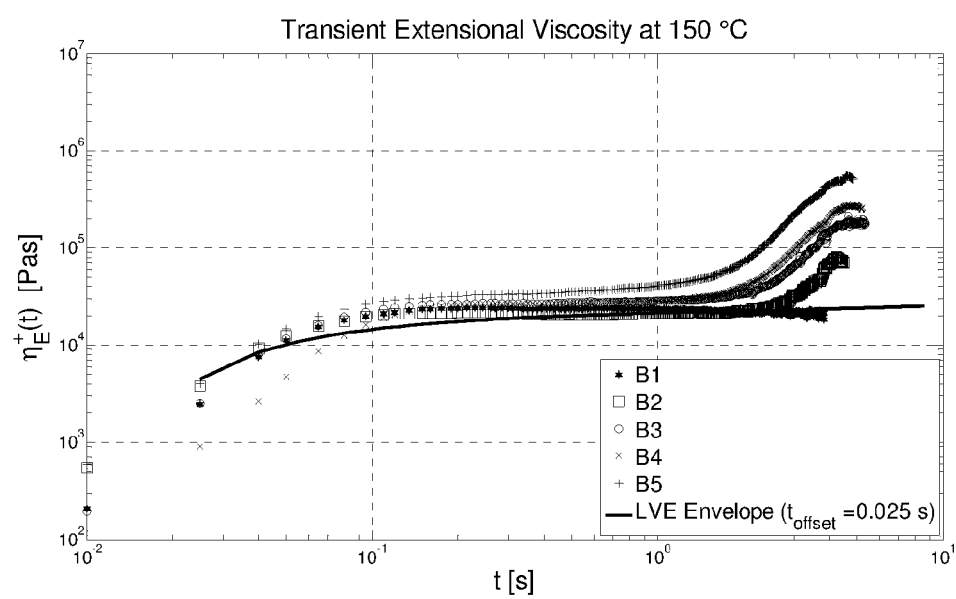
FIG. 1 is a graph of the strain hardening behavior for B2, B3, B4, and B5, compared to reference B1.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to, ethylene, hexene, and diene, the olefin present in such polymer or copolymer is the polymerized form of the olefin. For example, when a copolymer is said to have an "ethylene" content of 35 wt % to 55 wt %, it is understood that a mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. The term "different" as used to refer to mer units indicates that the mer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene," "ethylene polymer," "ethylene copolymer," and "ethylene based polymer" mean a polymer or copolymer comprising at least 50 mol % ethylene units (preferably at least 70 mol % ethylene units, more preferably at least 80 mol % ethylene units, more preferably at least 90 mol % ethylene units, even more preferably at least 95 mol % ethylene units or 100 mol % ethylene units (in the case of a homopolymer)). Furthermore, the term "polyethylene composition" means a blend containing one or more polyethylene components.

As used herein, the terms "polypropylene," "propylene polymer," "propylene copolymer," and "propylene based polymer" mean a polymer or copolymer comprising at least 50 mol % propylene units (preferably at least 70 mol % propylene units, more preferably at least 80 mol % propylene units, even more preferably at least 90 mol % propylene units, even more preferably at least 95 mol % propylene units or 100 mol % propylene units (in the case of a homopolymer)).

As used herein, the terms "polybutene," "butene polymer," "butene copolymer," and "butene based polymer" mean a polymer or copolymer comprising at least 50 mol % butene units (preferably at least 70 mol % butene units, more preferably at least 80 mol % butene units, even more preferably at least 90 mol % butene units, even more preferably at least 95 mol % butene units or 100 mol % butene units (in the case of a homopolymer)).

For purposes of this invention and the claims thereto, an "EP Rubber" is defined to be a copolymer of ethylene and propylene, and optionally diene monomer(s), chemically crosslinked (i.e., cured) or not, where the ethylene content is from 35 wt % to 80 wt %, the diene content is 0 wt % to 15 wt %, and the balance is propylene; and where the copolymer has a Mooney viscosity, ML(1+4) @125° C. (measured according to ASTM D1646) of 15 to 100. For purposes of this invention and the claims thereto, an "EPDM" or "EPDM Rubber" is defined to be an EP Rubber having diene present.

For purposes of this invention and the claims thereto, an ethylene polymer having a density of 0.86 g/cm$^3$ or less is referred to as an ethylene elastomer or elastomer; an ethylene polymer having a density of more than 0.86 g/cm$^3$ to less than 0.910 g/cm$^3$ is referred to as an ethylene plastomer or plastomer; an ethylene polymer having a density of 0.910 g/cm$^3$ to 0.940 g/cm$^3$ is referred to as a low density polyethylene; and an ethylene polymer having a density of more than 0.940 g/cm$^3$ is referred to as a high density polyethylene (HDPE). For these definitions, density is determined using the method described under Test Methods below.

Polyethylene in an overlapping density range, i.e., 0.890 g/cm$^3$ to 0.930 g/cm$^3$, typically from 0.915 g/cm$^3$ to 0.930 g/cm$^3$, which is linear and does not contain long chain branching is referred to as "linear low density polyethylene" (LLDPE) and can be produced with conventional Ziegler-Natta catalysts, vanadium catalysts, or with metallocene catalysts in gas phase reactors and/or in slurry reactors and/or with any of the disclosed catalysts in solution reactors.

"Linear" means that the polyethylene has no long chain branches; typically referred to as a $g'_{vis}$ of 0.95 or above, preferably 0.97 or above, preferably 0.98 or above.

Composition Distribution Breadth Index (CDBI) is a measure of the composition distribution of monomer within the polymer chains and is measured by the procedure described in PCT publication WO 93/03093, published Feb. 18, 1993, specifically columns 7 and 8, as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

Mw is weight average molecular weight, Mn is number average molecular weight and Mz is z average molecular weight.

DETAILED DESCRIPTION OF THE INVENTION

This invention relates to polyethylene compositions comprising one or more ethylene polymers (preferably linear ethylene polymers) and one or more dendritic hydrocarbon polymer modifiers (also referred to as the "modifier" or the "branched modifier").

This invention further relates to polyethylene blends comprising one or more ethylene polymers (preferably having a $g'_{vis}$ of 0.95 or more) and one or more dendritic hydrocarbon polymer modifiers, wherein the modifier has: 1) a $g'_{vis}$ value less than 0.75; 2) a Cayley tree topology with a layer number of 2 or more, preferably 3 or more; 3) optionally, an average Mw between the branch points of 1,500 g/mol or more, more preferably 3,000 g/mol or more, and most preferably 5,000 g/mol or more; and/or 4) optionally, at least 0.6 ppm (preferably at least 10 ppm, preferably at least 100 ppm, preferably at least 1000 ppm, preferably at least 5000 ppm) of silicon (as determined by ICPES). The dendritic hydrocarbon polymer modifiers preferably have a crystallinity greater than 10%, preferably greater than 15%, preferably greater than 20%, preferably greater than 40%, as determined by DSC as described below.

This invention further relates to polyethylene blends comprising one or more ethylene polymers (preferably having a $g'_{vis}$ of 0.95 or more) and one or more dendritic hydrocarbon polymer modifiers, wherein the modifier has: 1) a $g'_{vis}$ value less than 0.75; 2) a Cayley tree topology with a layer number of 2 or more, preferably 3 or more; 3) an average Mw between the branch points of 1,500 g/mol or more, more preferably 3,000 g/mol or more, and most preferably 5,000 g/mol or more.

In another embodiment of the invention, this invention relates to a composition comprising:

1) from 99.99 wt % to 50 wt % (preferably from 75 wt % to 99.9 wt %, preferably from 90 wt % to 99.9 wt %, preferably from 95 wt % to 99.5 wt %, preferably from 96 wt % to 99.5 wt %, preferably from 97 wt % to 99.5 wt %, preferably from 98 wt % to 99 wt %), based upon the weight of the blend, of an ethylene polymer having:
  a) a branching index, $g'_{vis}$ (determined according the procedure described in the Test Method section below) of 0.95 or more, preferably 0.97 or more, preferably 0.98 or more, preferably 0.99 or more; and
  b) a density of 0.860 to 0.980 g/cc (preferably from 0.870 to 0.960 g/cc, preferably from 0.880 to 0.940 g/cc, preferably from 0.900 to 0.935 g/cc, preferably from 0.910 to 0.930 g/cc);
  c) an Mw of 20,000 g/mol or more (preferably 20,000 to 2,000,000 g/mol, preferably 30,000 to 1,000,000 g/mol, preferably 40,000 to 200,000 g/mol, preferably 50,000 to 750,000 g/mol); and 2) from 0.01 wt % to 50 wt % (preferably from 0.1 wt % to 25 wt %, preferably from 0.2 wt % to 10 wt %, preferably from 0.25 wt % to 5 wt %, preferably from 0.5 wt % to 4 wt %, preferably from 0.5 wt % to 3 wt %, preferably from 0.5 wt % to 2 wt %), based upon the weight of the blend, of a dendritic hydrocarbon polymer modifier(s), wherein the modifier has: 1) a $g'_{vis}$ value less than 0.75 (preferably less than 0.70, preferably less than 0.65, preferably less than 0.60, preferably less than 0.55, preferably less than 0.50, preferably less than 0.45, preferably less than 0.40); 2) a Cayley tree topology with a layer number of 2 or more, preferably 3 or more; 3) optionally, an average Mw between the branch points of 1,500 g/mol or more (preferably 3,000 g/mol or more, preferably 5,000 g/mol or more); 4) optionally, a crystallinity greater than 10% (preferably greater than 15%, preferably greater than 20%, as determined by DSC as described below); 5) optionally, a heat of fusion greater than 0 J/g, (preferably greater than 10 J/g, preferably greater than 60 J/g, preferably greater than 100 J/g, as determined by DSC as described below); and 6) optionally, at least 0.6 ppm (preferably at least 10 ppm, preferably at least 100 ppm, preferably at least 1000 ppm, preferably at least 5000 ppm) of silicon (as determined by ICPES).

In another embodiment, the polyethylene/modifier compositions of this invention comprise less than 5 wt %, (preferably less than 1 wt %, preferably 0 wt %) propylene homopolymer or copolymer, based upon the weight of the composition.

In another embodiment, the polyethylene/modifier compositions of this invention comprise less than 5 wt %, (preferably less than 1 wt %, preferably 0 wt %) EP Rubber, based upon the weight of the composition.

In a preferred embodiment, this invention comprises a blend comprising:

a) any branched modifier described herein present at from 0.1 wt % to 99.5 wt %, (preferably from 0.1 wt % to 25 wt %, preferably from 0.2 wt % to 10 wt %, preferably from 0.25 wt % to 5 wt %, preferably from 0.5 wt % to 4 wt %, preferably from 0.5 wt % to 3 wt %, preferably from 0.5 wt % to 2 wt %, based upon the weight of the blend); and b) one or more ethylene polymers having a $g'_{vis}$ of 0.95 or more, a CDBI of 60% or more, and a density of 0.90 g/cc or more, wherein the ethylene polymer has a $g'_{vis}$ of at least 0.01 units higher than the $g'_{vis}$ of the branched modifier (preferably at least 0.02, preferably at least 0.03, preferably at least 0.04, preferably at least 0.05, preferably at least 0.1, preferably at least 0.2, preferably at least 0.3, preferably at least 0.4, preferably at least 0.45 units higher).

Modified Blends

In a preferred embodiment, the blends comprising the polyethylene (preferably linear polyethylene) described herein and the branched modifier described herein have a strain hardening ratio (SHR) of 1.1 or more, preferably 1.5 or more, preferably 2.0 or more, when the extensional viscosity is measured at a strain rate of 1 sec$^{-1}$ and at a temperature of 150° C. as describe below in the Test Methods.

In a preferred embodiment, the polyethylene compositions comprising one or more ethylene polymers and one or more branched modifiers show characteristics of strain hardening in extensional flow. Strain hardening is observed as a sudden, abrupt upswing of the extensional viscosity in the transient extensional viscosity vs. time plot. This abrupt upswing, away from the behavior of a linear viscoelastic material, was reported in the 1960s for LDPE (reference: J. Meissner, Rheology Acta., Vol. 8, 78, 1969) and was attributed to the presence of long branches in the polymer. In one embodiment, the inventive polyethylene compositions have strain-hardening in extensional viscosity. The strain-hardening ratio is preferably 1.2 or more, preferably 1.5 or more, more preferably 2.0 or more, and even more preferably 2.5 or more, when the extensional viscosity is measured at a strain rate of 1 sec$^{-1}$ and at a temperature of 150° C.

In one embodiment, the melt strength of inventive polyethylene composition is at least 5% higher than the melt strength of ethylene polymer component(s) used in the blend.

Rheology of the inventive composition can be different from the rheology of the ethylene polymer component, depending on the properties of the branched modifier polymer. In one embodiment, the difference in complex shear viscosity between the inventive composition and ethylene polymer component(s) is less than 10%, preferably less than 5% at all frequencies.

In another embodiment, the complex shear viscosity of the inventive polyethylene composition is at least 10% higher than the complex viscosity of the ethylene polymer component(s) employed in the blend composition when the complex viscosity is measured at a frequency of 0.1 rad/sec and a temperature of 190° C., and the complex viscosity of the inventive polyethylene composition is the same or less than the complex viscosity of the ethylene polymer component used in the blend composition when the complex viscosity is measured at a frequency of 398 rad/sec and a temperature of 190° C. The complex shear viscosity is measured according to procedure described in the Test Method section below. Alternatively, the shear thinning ratio of the inventive composition is at least 10% higher than the shear thinning ratio of the ethylene polymer component.

Preferably, the blend of the polyethylene and the modifier has a melt index, as measured by ASTM D-1238 at 190° C.

and 2.16 kg in the range of from 0.01 dg/min to 100 dg/min in one embodiment, from 0.01 dg/min to 50 dg/min in a more particular embodiment, from 0.02 dg/min to 20 dg/min in yet a more particular embodiment, from 0.03 dg/min to 2 dg/min in yet a more particular embodiment, and from 0.002 dg/min to 1 dg/min in yet a more particular embodiment.

Preferably, the HLMI, also referred to as the I21, (ASTM D 1238190° C., 21.6 kg) of the blend of the polyethylene and the modifier ranges from 0.01 to 800 dg/min in one embodiment, and from 0.1 to 500 dg/min in another embodiment, from 0.5 to 300 dg/min in yet a more particular embodiment, and from 1 to 100 dg/min in yet a more particular embodiment, wherein a desirable range is any combination of any upper I21 limit with any lower I21 limit.

Preferably, the blend of the polyethylene and the modifier has a melt index ratio (MIR, or I21/I2, ASTM D 1238, 190° C., 21.6 kg/2.16 kg) of from 10 to 500 in one embodiment, from 15 to 300 in a more particular embodiment, and from 20 to 200 in yet a more particular embodiment. Alternately, the modifiers may have a melt index ratio of from greater than 15 in one embodiment, greater than 20 in a more particular embodiment, greater than 30 in yet a more particular embodiment, greater than 40 in yet a more particular embodiment, and greater than 50 in yet a more particular embodiment.

Preferably, the blend of the polyethylene and the modifier is gel-free. Presence of gel can be detected by dissolving the material in xylene at xylene's boiling temperature. Gel-free product should be dissolved in xylene. In one embodiment, the branched modifier has 5 wt % or less (preferably 4 wt % or less, preferably 3 wt % or less, preferably 2 wt % or less, preferably 1 wt % or less, preferably 0 wt %) of xylene insoluble material.

In a preferred embodiment, this invention relates to a composition comprising more than 25 wt % (based on the weight of the composition) of one or more ethylene polymers having a $g'_{vis}$ of 0.95 or more, an $M_W$ of 20,000 g/mol or more, and at least 0.1 wt % of a dendritic hydrocarbon polymer modifier where the modifier has a $g'_{vis}$ of less than 0.75, wherein the ethylene polymer has a $g'_{vis}$ of at least 0.25 units higher than the $g'_{vis}$ of the branched modifier.

In a preferred embodiment, films, preferably blown films, produced from the blend of polyethylene and modifier have an Elmendorf Tear, (reported in grams (g) or grams per mil (g/mil) as determined by ASTM D-1922) of at least 100 g/mil, preferably at least 150 g/mil, preferably at least 200 g/mil, wherein a desirable blend may exhibit any combination of any upper limit with any lower limit.

In a preferred embodiment, films, preferably blown films, produced from the blend of polyethylene and modifier has a haze, (measured according to ASTM D1003) of 25 or less, preferably 15 or less, preferably 10 or less.

In a preferred embodiment, films, preferably blown films, produced from the blends of polyethylene and modifier described herein has an Dart Drop, (determined as described in the Test Methods below and reported as grams per mil) of at least 100 g/mil, preferably at least 150 g/mil, preferably at least 200 g/mil.

In a preferred embodiment, films, preferably blown films, produced from the blends of polyethylene and modifier described herein, are at least 0.3 mils thick, preferably at least 0.5 mils thick, preferably at least 1.0 mils thick; and preferably the films are less than 5 mils thick, preferably less than 3 mils thick, preferably less than 2 mils thick, wherein a desirable blend may exhibit any combination of any upper limit with any lower limit.

Dendritic Hydrocarbon Polymer Modifiers

The polyethylene compositions of the present invention include a dendritic hydrocarbon polymer modifier (also referred to as a "modifier" or a "branched modifier" or a "branched modifier polymer" or a "dendritic modifier" herein). It will be realized that the classes of materials described herein that are useful as modifiers can be utilized alone or admixed with other modifiers described herein in order to obtain desired properties.

In a preferred embodiment, the modifier has: 1) a $g'_{vis}$ value less than 0.75 (preferably less than 0.45, preferably less than 0.40, preferably less than 0.35, preferably less than 0.30); 2) a Cayley tree topology with a layer number of 2 or more, preferably 3 or more, preferably 4 or more; 3) optionally, an average Mw between the branch points of 1,500 g/mol or more (preferably 3,000 g/mol or more, preferably 5,000 g/mol or more); 4) optionally, a crystallinity greater than 10% (preferably greater than 15%, preferably greater than 20%, as determined by DSC as described below); 5) optionally, a heat of fusion greater than 0 J/g, (preferably greater than 10 J/g, preferably greater than 60 J/g, preferably greater than 100 J/g, as determined by DSC as described below); and 6) optionally, the modifier contains at least 0.6 ppm (preferably at least 10 ppm, preferably at least 100 ppm, preferably at least 1000 ppm, preferably at least 5000 ppm) of silicon (as determined by ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, eds., Butterworth-Heinemann, Boston, Mass., 1992, pp. 633-644, is used to determine the amount of an element in a material).

The average Mw between branch points and the average number of carbon atoms between the branch points are determined by $^1$H NMR. The average number of carbon atoms between the branch points (Z) is determined by the following formula:

$$Z=[A]/[(B\times(C+1))-D]$$

where A is the total number of carbons as determined by $^1$H NMR, B is the branch functionality (e.g. the number of branches in the connector (such as three for a trifunctional silane or 4 for a tetrafunctional silane), preferably 3 or 4), C is the number of branch points as determined by $^1$H NMR (such as the number of Si atoms present if a silane connector is used), and D is the number of free chain ends as determined by $^1$H NMR. The average Mw between branch points is Z×14.02698. One should note that the $^1$H NMR results can be influenced by the presence of free or unreacted connectors in the modifier. The $^1$H NMR procedure is described below in the Test Methods section.

Figure 3:
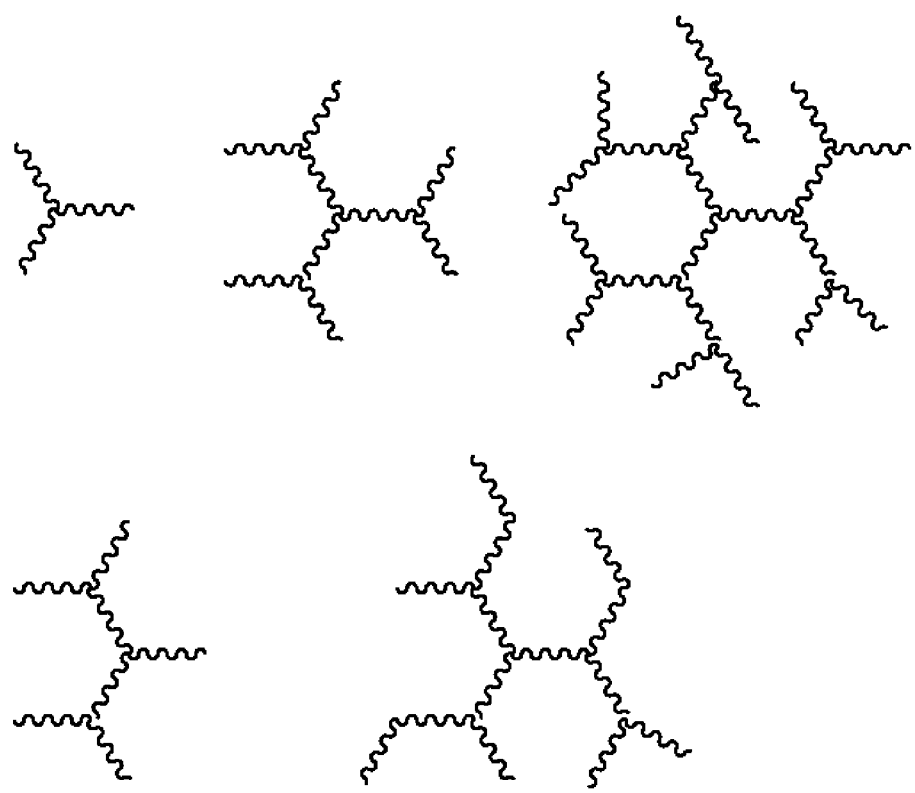
FIG. 3 presents illustrations of Cayley tree topology.
Figure 4:
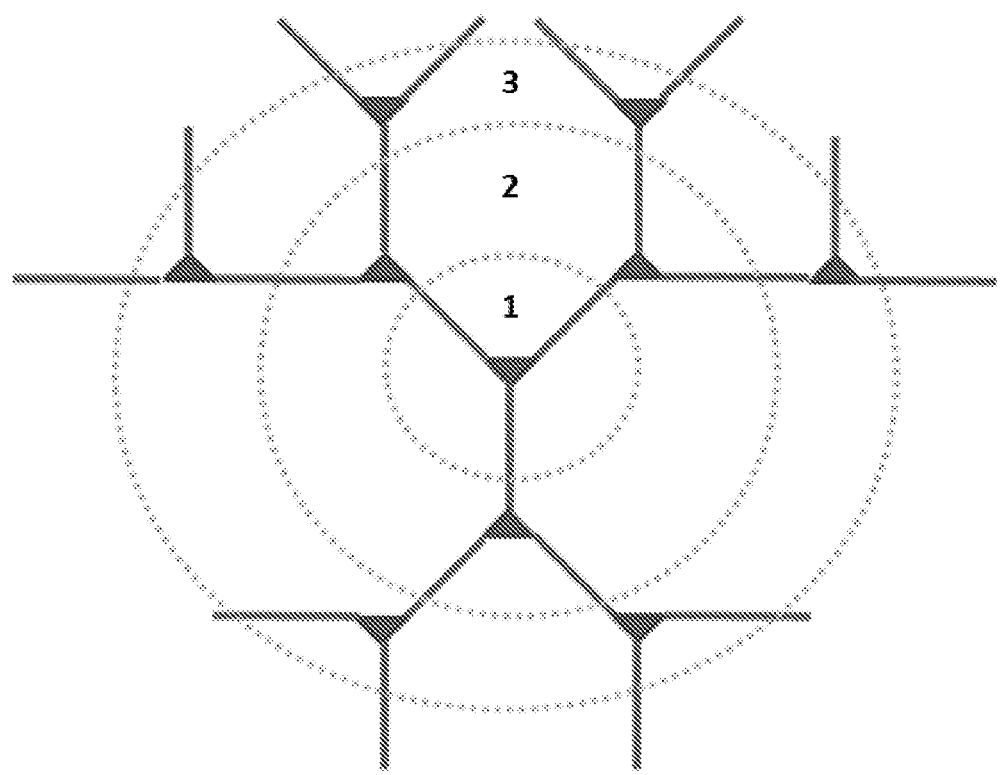
FIG. 4 presents illustrations of Cayley tree layer numbers.

The dendritic hydrocarbon polymer modifiers used in this invention are described as having a Cayley tree topology with at least two (preferably at least three) layers or having at least a second (preferably at least third generation) Cayley tree topology as referenced in Van Ruymbeke et al. Macromolecules, 2007, Vol. 40, No. 16 and Blackwell et al., Macromolecules, 2001, 34, pp. 2579-2596. Referring to FIG. 3, the three armed material on the top left is referred to as having one layer, the structure in the top middle is referred to as having two layers and the structure on the top right is referred to as having three layers. The structures on the bottom left and right are examples of two and three layer materials, even though each branch point is not symmetric. For purposes of this invention and the claims thereto, it is not necessary that all branch points in the Cayley tree structure be symmetrically substituted. Missing tree branches due, for example, to the capped connector functionality or steric hindrance in affecting linkers reacting with one of the functionality on the connector is acceptable as long as the layer number is 2 and above. The layer number affects the relaxation priority and is an important component in affecting the extensional relaxation. In any embodiment of the invention as described herein, the dendritic hydrocarbon polymer modifiers may have a Cayley tree topology with at least four (alternately at least 5) layers or having at least a fourth (preferably fifth) generation Cayley tree topology. The layer number is referred to as "n" in Blackwell et al., Macromolecules, 2001, 34, pp. 2579-2596. Using the assembly method with connectors and linkers, the symmetric or asymmetric Cayley tree structures are achieved. The layer numbers can be determined based on molecular weight fractionation (for example, where the modifier begins with a tri-armed material, layer 2 will have an Mn roughly equal to the linker Mn times 9 and layer 3 will have an Mn roughly equal to the linker Mn times 21, etc.) and relaxation fractionation (based on Small Amplitude Oscillatory Shear test where two relaxation peaks will be found for layer 2, 3 relaxation peaks will be detected for layer 3, and so on).

In a preferred embodiment of the invention, the dendritic hydrocarbon polymer modifiers have an average Mw of 1500 g/mol or more, preferably 3,000 g/mol or more, preferably 5000 g/mol or more between branch points.

In any embodiment of the invention described herein, the dendritic hydrocarbon polymer modifiers has:
i) a $g'_{vis}$ of less than 0.75 (preferably less than 0.70, preferably less than 0.65, preferably less than 0.60, preferably less than 0.55, preferably less than 0.50, preferably less than 0.45, preferably less than 0.40);
ii) a density of from about 0.880 to about 0.980 g/cm$^3$ (preferably from 0.890 to 0.940 g/cc, preferably from 0.900 to 0.935 g/cc, preferably from 0.910 to 0.930 g/cc);
iii) a molecular weight distribution (Mw/Mn) of from about 1 to about 40 (preferably 1.5 to 20, preferably 2.0 to 20); and
iv) optionally, less than 5 wt % xylene insoluble material (preferably 4 wt % or less, preferably 3 wt % or less, preferably 2 wt % or less, preferably 1 wt % or less, preferably 0 wt %).

In any embodiment of the invention described herein, any of the dendritic hydrocarbon polymer modifiers of this invention have at least 0.6 ppm (preferably at least 10 ppm, preferably at least 100 ppm, preferably at least 1000 ppm, preferably at least 5000 ppm) of silicon (as determined by ICPES).

This invention further relates to a dendritic hydrocarbon polymer modifier where the modifier: a) has a $g'_{vis}$ of 0.75 or less (preferably less than 0.70, preferably less than 0.65, preferably less than 0.60, preferably less than 0.55, preferably less than 0.50, preferably less than 0.45, preferably less than 0.40, preferably 0.35 or less, preferably 0.30 or less); b) is essentially gel free (preferably 5 wt % or less of xylene insoluble material, preferably 4 wt % or less, preferably 3 wt % or less, preferably 2 wt % or less, preferably 1 wt % or less, preferably 0 wt %); c) has an Mw of 10,000 g/mol or more (preferably 25,000 or more, preferably 50,000 or more); d) a Cayley tree topology with 2 or more layers, preferably 3 or more layers, preferably 4 or more layers; e) an average Mw between the branch points that is greater than 1500 g/mol; f) an Hf greater than 0 J/g, greater than 20 J/g; g) a percent crystallinity of 10% or more; h) an Mw/Mn of greater than 1 to less than 10, (preferably 1.2 to 8, preferably 1.5 to 5); and i) optionally, at least 0.6 ppm (preferably at least 10 ppm, preferably at least 100 ppm, preferably at least 1000 ppm, preferably at least 5000 ppm) of silicon (as determined by ICPES).

In a preferred embodiment of the invention, the modifiers comprise side chain branches that are ethyl, butyl, or hexyl as determined by $^{13}$C NMR as described below.

In a preferred embodiment, the modifiers are dendritic hydrocarbon polymers, preferably substantially saturated dendritic hydrocarbon polymers, preferably saturated dendritic hydrocarbon polymers as determined by $^{13}$C NMR as described below.

In a preferred embodiment, the modifiers are prepared by polymerizing polybutadiene, then hydrogenating the polymer product to form a copolymer that appears to be derived from ethylene and butene.

In a preferred embodiment, the dendritic hydrocarbon polymers used as modifier herein are prepared as described in US 2011/0118420. For example, in a preferred embodiment, the modifiers are prepared (as described in US 2011/0118420) by assembling telechelic polybutadiene or polyethylene using tri or tetrafunctional connectors. Using a trifunctional connector (such as, trifunctional silanes of trichloromethylsilane, trichloroethoxysilane, 1-dichloromethyl-2-chlorodimethyl-disiloxane, 1-dichloromethylsilyl-2-chlorodimethylsilyl ethane, or triols of 1,3,5-benzenetriol, 1,2,6-hexanetriol, 1,1,1-tris(hydroxymethyl)propane, or tricarboxylic acids of 1,2,4-benzenecarboxylic anhydride, 1,3,5-benzenecarboxylic acid), the resulting Cayley tree will have a layer number of 3 whereas a layer number of 4 can be obtained by using a tetrafunctional connector (such as tetrafunctional silane of tetrachlorosilane or tetrabromosilane). If telechelic polybutadiene is used as the linker in between connectors, subsequent hydrogenation is used to deliver a polyethylene copolymer.

The branched structure of the modifiers and the blends containing the modifiers can also be observed by Small Amplitude Oscillatory Shear (SAOS) measurement of the molten polymer performed on a dynamic (oscillatory) rotational rheometer. From the data generated by such a test it is possible to determine the phase or loss angle δ, which is the inverse tangent of the ratio of G" (the loss modulus) to G' (the storage modulus). For a typical linear polymer, the loss angle at low frequencies (or long times) approaches 90 degrees, because the chains can relax in the melt, adsorbing energy, and making the loss modulus much larger than the storage modulus. As frequencies increase, more of the chains relax too slowly to absorb energy during the oscillations, and the storage modulus grows relative to the loss modulus. Eventually, the storage and loss moduli become equal and the loss angle reaches 45 degrees. In contrast, a branched chain polymer relaxes very slowly, because the branches need to retract first before the chain backbone can relax along its tube in the melt. This polymer never reaches a state where all its chains can relax during an oscillation, and the loss angle never reaches 90 degrees even at the lowest frequency, ω, of the experiments. The loss angle is also relatively independent of the frequency of the oscillations in the SAOS experiment; another indication that the chains can not relax on these timescales.

As known by one of skill in the art, rheological data may be presented by plotting the phase angle versus the absolute value of the complex shear modulus (G*) to produce a van Gurp-Palmen plot. The plot of conventional polyethylene polymers shows monotonic behavior and a negative slope toward higher G* values. Conventional LLDPE polymer without long chain branches exhibit a negative slope on the van Gurp-Palmen plot. The van Gurp-Palmen plots of some embodiments of the branched modifier polymers described in the present disclosure exhibit two slopes—a positive slope at lower G* values and a negative slope at higher G* values.

In a plot of the phase angle δ versus the measurement frequency ω, polymers that have long chain branches exhibit a plateau in the function of δ(ω), whereas linear polymers do not have such a plateau. According to Garcia-Franco et al. (Macromolecules 2001, 34, No. 10, pp. 3115-3117), the plateau in the aforementioned plot will shift to lower phase angles δ when the amount of long chain branching occurring in the polymer sample increases. Dividing the phase angle at which the plateau occurs by a phase angle of 90°, one obtains the critical relaxation exponent n which can then be used to calculate a gel stiffness using the equation:

$$\eta^*(\omega) = S\Gamma(1-n)\omega^{n-1}$$

wherein $\eta^*$ represents the complex viscosity (Pa·s), ω represents the frequency, S is the gel stiffness, Γ is the gamma function (see Beyer, W. H. Ed., CRC Handbook of Mathematical Sciences $5^{th}$ Ed., CRC Press, Boca Rotan, 1978), and n is the critical relaxation exponent. Modifiers useful herein preferably have a gel stiffness of more than 150 Pa·s, preferably at least 300 Pa·s, and more preferably at least 500 Pa·s. The gel stiffness is determined at the test temperature of 190° C. A preferred critical relaxation exponent n for the modifiers useful herein is less than 1 and more than 0, generally, n will be between 0.1 and 0.92, preferably between 0.2 and 0.85.

Small amplitude oscillatory shear data can be transformed into discrete relaxation spectra using the procedure on pages 273-275 in R. B. Bird, R. C. Armstrong, and O. Hassager, *Dynamics of Polymeric Liquids, Volume 1, Fluid Mechanics,* $2^{nd}$ Edition, John Wiley and Sons, (1987). The storage and loss moduli are simultaneously least squares fit with the functions, $$G'(\omega_j) = \Sigma \eta_k \lambda_k \omega_j^2 / (\eta_k \omega_k)^2)$$

$$G''(\omega_j) = \Sigma \eta_k \lambda_k \omega_j / (1 + (\eta_k \omega_k)^2)$$

at the relaxation times $\lambda_k$=0.01, 0.1, 1, 10, and 100 seconds. The sums are from k=1 to k=5. The sum of the $\eta_k$'s is equal to the zero shear viscosity, $\eta_0$. An indication of high levels of branched block products is a high value of $\eta_5$, corresponding to the relaxation time of 100 s, relative to the zero shear viscosity. The viscosity fraction of the 100 s relaxation time is $\eta_5$ divided by the zero shear viscosity, $\eta_0$.

The modifiers used herein preferably have good shear thinning. Shear thinning is characterized by the decrease of the complex viscosity with increasing shear rate. One way to quantify the shear thinning is to use a ratio of complex viscosity at a frequency of 0.01 rad/s to the complex viscosity at a frequency of 100 rad/s. Preferably, the complex viscosity ratio of the modifier is 20 or more, more preferably 50 or more, even more preferably 100 or more, when the complex viscosity is measured at 190° C.

Shear thinning can be also characterized using a shear thinning index. The term "shear thinning index" is determined using plots of the logarithm (base ten) of the dynamic viscosity versus logarithm (base ten) of the frequency. The slope is the difference in the log (dynamic viscosity) at a frequency of 100 rad/s and the log(dynamic viscosity) at a frequency of 0.01 rad/s divided by 4. These plots are the typical output of small amplitude oscillatory shear (SAOS) experiments. For purposes of this invention, the SAOS test temperature is 190° C. for ethylene polymers and blends thereof. Polymer viscosity is conveniently measured in Pascal*seconds (Pa*s) at shear rates within a range of from 0.01 to 398 rad/sec and at 190° C. under a nitrogen atmosphere using a dynamic mechanical spectrometer such as the Advanced Rheometrics Expansion System (ARES). Generally a low value of shear thinning index indicates that the polymer is highly shear-thinning and that it is readily processable in high shear processes, for example by injection molding. The more negative this slope, the faster the dynamic viscosity decreases as the frequency increases. Preferably, the modifier has a shear thinning index of less than −0.2. These types of modifiers are easily processed in high shear rate fabrication methods, such as injection molding.

The branched modifier useful herein also preferably has characteristics of strain hardening in extensional viscosity. An important feature that can be obtained from extensional viscosity measurements is the attribute of strain hardening in the molten state. Strain hardening is observed as a sudden, abrupt upswing of the extensional viscosity in the transient extensional viscosity vs. time plot. This abrupt upswing, away from the behavior of a linear viscoelastic material, was reported in the 1960s for LDPE (reference: J. Meissner, Rheol. Acta., Vol. 8, 78, 1969) and was attributed to the presence of long branches in the polymer. The strain-hardening ratio (SHR) is defined as the ratio of the maximum transient extensional viscosity over three times the value of the transient zero-shear-rate viscosity at the same strain rate. Strain hardening is present in the material when the ratio is greater than 1. In one embodiment, the branched modifiers show strain-hardening in extensional flow. Preferably the strain-hardening ratio is 2 or greater, preferably 5 or greater, more preferably 10 or greater, and even more preferably 15 or more, when extensional viscosity is measured at a strain rate of 1 $sec^{-1}$ and at a temperature of 150° C.

The branched modifier also generally exhibits melt strength values greater than that of conventional linear or long chain branched polyethylene of similar melt index. As used herein, "melt strength" refers to the force required to draw a molten polymer extrudate at a rate of 12 $mm/s^2$ at an extrusion temperature of 190° C. until breakage of the extrudate whereby the force is applied by take up rollers. In one embodiment, the melt strength of the branched modifier polymer is at least 20% higher than that of a linear polyethylene with the same density and MI.

In a preferred embodiment, the branched modifier has a strain hardening ratio of 5 or more, preferably 10 or more, preferably 20 or more, preferably 30 or more, preferably 40 or more, preferably 50 or more; and/or an Mw of 50,000 g/mol or more, preferably from 50,000 to 2,000,000 g/mol, alternately from 100,000 to 1,000,000 g/mol, alternately from 150,000 to 750,000 g/mol.

Preferably, the modifier has a melt index as measured by ASTM D-1238 at 190° C. and 2.16 kg in the range of from 0.01 dg/min to 100 dg/min in one embodiment, from 0.01 dg/min to 50 dg/min in a more particular embodiment, from 0.02 dg/min to 20 dg/min in yet a more particular embodiment, from 0.03 dg/min to 2 dg/min in yet a more particular embodiment, and from 0.002 dg/min to 1 dg/min in yet a more particular embodiment.

Preferably, the HLMI (ASTM D 1238190° C., 21.6 kg) of the modifier ranges from 0.01 to 800 dg/min in one embodiment, and from 0.1 to 500 dg/min in another embodiment, from 0.5 to 300 dg/min in yet a more particular embodiment, and from 1 to 100 dg/min in yet a more particular embodiment wherein a desirable range is any combination of any upper I21 limit with any lower I21 limit.

The modifiers useful herein preferably have a melt index ratio (MIR, or I21/I2) of from 10 to 500 in one embodiment, from 15 to 300 in a more particular embodiment, and from 20 to 200 in yet a more particular embodiment. Alternately, the modifiers may have a melt index ratio of from greater than 15 in one embodiment, greater than 20 in a more particular embodiment, greater than 30 in yet a more particular embodiment, greater than 40 in yet a more particular embodiment, and greater than 50 in yet a more particular embodiment.

Preferably the branched modifier is gel-free. Presence of gel can be detected by dissolving the material in xylene at xylene's boiling temperature. Gel-free product should be dissolved in xylene. In one embodiment, the branched modifier has 5 wt % or less (preferably 4 wt % or less, preferably 3 wt % or less, preferably 2 wt % or less, preferably 1 wt % or less, preferably 0 wt %) of xylene insoluble material.

The branched modifier preferably has an $M_W$ of 10,000 to 2,000,000 g/mol, preferably 20,000 to 1,000,000, more preferably 30,000 to 500,000, as measured by size exclusion chromatography, as described below in the Test Method section below, and/or an $M_w/M_n$ of 2 to 40, preferably 2.5 to 30, more preferably 3 to 20, more preferably 3 to 25, as measured by size exclusion chromatography, and/or a $M_z/M_W$ of 2 to 50, preferably 2.5 to 30, more preferably 3 to 20, more preferably 3 to 25.

The branched modifier preferably has a density of 0.85 to 0.97 g/cm³, preferably 0.86 to 0.965 g/cm³, preferably 0.88 to 0.96 g/cm³, alternatively between 0.860 and 0.910 g/cm³, alternatively between 0.910 and 0.940 g/cm³, or alternatively between 0.94 to 0.965 g/cm³ (determined according to ASTM D 1505 using a density-gradient column on a compression-molded specimen that has been slowly cooled to room temperature (i.e., over a period of 10 minutes or more) and allowed to age for a sufficient time that the density is constant within +/−0.001 g/cm³).

In a preferred embodiment, any branched modifier described herein has a $g'_{(Z\ ave)}$ of 0.90 or less, preferably 0.85 or less, preferably 0.80 or less, preferably 0.75 or less, preferably 0.70 or less, preferably 0.65 or less, preferably 0.60 or less.

Z average branching index ($g'_{(Z\ ave)}$) is determined using data generated using the SEC-DRI-LS-VIS procedure described in the Test Methods section, paragraph [0334] to [0341], pages 24-25 of US 2006/0173123 (including the references cited therein, except that the GPC procedure is run as described in the Test Methods section below), where $$g'_{Zave} = \frac{\sum C_i [\eta_i]_b}{\sum C_i K M_i^\alpha}$$

where $[\eta_i]_b$ is the viscosity of the polymer in slice i of the polymer peak, $M_i$ is the weight averaged molecular weight in slice i of the polymer peak measured by light scattering, K and α are the parameters for linear polyethylene (K=0.000579 and α=0.695), and $C_i$=polymer concentration in the slice i in the polymer peak times the mass of the slice squared, $M_i^2$.

In a preferred embodiment, the modifier has a shear thinning ratio of complex viscosity at a frequency of 0.01 rad/sec to the complex viscosity at a frequency of 398 rad/sec greater than 53.9*I2$^{(-0.74)}$, where I2 is the melt index according to ASTM 1238 D, 190° C., 2.16 kg.

In another embodiment of the invention, any modifier described herein has no amyl branches (e.g., amyl branches are present at 0 wt %) as described in Journal of Applied Polymer Science, 1978, Vol. 22, No. 2, pages 585-588).

Ethylene Polymers

The modifiers described herein are blended with at least one ethylene polymer to prepare the compositions of this invention.

In one aspect of the invention, the ethylene polymer is selected from ethylene homopolymer, ethylene copolymers, and blends thereof. Useful copolymers comprise one or more comonomers in addition to ethylene and can be a random copolymer, a statistical copolymer, a block copolymer, and/or blends thereof. In particular, the ethylene polymer blends described herein may be physical blends or in situ blends of more than one type of ethylene polymer or blends of ethylene polymers with polymers other than ethylene polymers where the ethylene polymer component is the majority component (e.g., greater than 50 wt %). The method of making the polyethylene is not critical, as it can be made by slurry, solution, gas phase, high pressure, or other suitable processes, and by using catalyst systems appropriate for the polymerization of polyethylenes, such as Ziegler-Natta-type catalysts, chromium catalysts, metallocene-type catalysts, other appropriate catalyst systems, or combinations thereof, or by free-radical polymerization. In a preferred embodiment, the ethylene polymers are made by the catalysts, activators and processes described in U.S. Pat. Nos. 6,342,566; 6,384,142; 5,741,563; PCT publications WO 03/040201; and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000).

Preferred ethylene polymers and copolymers that are useful in this invention include those sold by ExxonMobil Chemical Company in Houston Tex., including those sold as ExxonMobil HDPE, ExxonMobil LLDPE, and ExxonMobil LDPE; and those sold under the ENABLE™, EXACT™, EXCEED™, ESCORENE™, EXXCO™, ESCOR™, PAXON™, and OPTEMA™ tradenames.

In a preferred embodiment of the invention, the polyethylene copolymers preferably have a composition distribution breadth index (CDBI) of 60% or more, preferably 60% to 80%, preferably 65% to 80%. In another preferred embodiment, the ethylene copolymer has a density of 0.910 to 0.950 g/cm³ (preferably 0.915 to 0.940 g/cm³, preferably 0.918 to 0.925 g/cm³) and a CDBI of 60% to 80%, preferably between 65% and 80%. Preferably these polymers are metallocene polyethylenes (mPEs).

In another embodiment, the ethylene copolymer comprises one or more mPEs described in US 2007/0260016 and U.S. Pat. No. 6,476,171, e.g., copolymers of an ethylene and at least one alpha olefin having at least 5 carbon atoms obtainable by a continuous gas phase polymerization using supported catalyst of an activated molecularly discrete catalyst in the substantial absence of an aluminum alkyl based scavenger (e.g., triethylaluminum, trimethylaluminum, triisobutyl aluminum, tri-n-hexylaluminum, and the like), which polymer has a Melt Index of from 0.1 to 15 (ASTM D 1238, condition E); a CDBI of at least 70%, a density of from 0.910 to 0.930 g/cc; a Haze (ASTM D1003) value of less than 20; a Melt Index ratio (I21/I2, ASTMD 1238) of from 35 to 80; an averaged Modulus (M) (as defined in U.S. Pat. No. 6,255,426) of from 20,000 to 60,000 psi (13790 to 41369 N/cm$^2$); and a relation between M and the Dart Impact Strength (26 inch, ASTM D 1709) in g/mil (DIS) complying with the formula:

$$DIS \geq 0.8 \times [100 + e^{(11.71 - 0.000268 \times M + 2.183 \times 10^{-9} \times M^2)}],$$

where "e" represents 2.1783, the base Napierian logarithm, M is the averaged Modulus in psi and DIS is the 26 inch (66 cm) dart impact strength. (See U.S. Pat. No. 6,255,426 for further description of such ethylene polymers.)

In another embodiment, the ethylene polymer comprises a Ziegler-Natta polyethylene, e.g., CDBI less than 50, preferably having a density of 0.910 to 0.950 g/cm$^3$ (preferably 0.915 to 0.940 g/cm$^3$, preferably 0.918 to 0.925 g/cm$^3$).

In another embodiment, the ethylene polymer comprises olefin block copolymers as described in EP 1 716 190.

In another embodiment, the ethylene polymer is produced using chrome based catalysts, such as, for example, in U.S. Pat. No. 7,491,776 including that fluorocarbon does not have to be used in the production. Commercial examples of polymers produced by chromium include the Paxon™ grades of polyethylene produced by ExxonMobil Chemical Company, Houston Tex.

In another embodiment, the ethylene polymer comprises ethylene and an optional comonomer of propylene, butene, pentene, hexene, octene nonene or decene, and said polymer has a density of more than 0.86 to less than 0.910 g/cm$^3$, an Mw of 20,000 g/mol or more (preferably 50,000 g/mol or more) and a CDBI of 90% or more.

In another embodiment, the ethylene polymer comprises a substantially linear and linear ethylene polymers (SLEPs). Substantially linear ethylene polymers and linear ethylene polymers and their method of preparation are fully described in U.S. Pat. Nos. 5,272,236; 5,278,272; 3,645,992; 4,937,299; 4,701,432; 4,937,301; 4,935,397; 5,055,438; EP 129,368; EP 260,999; and WO 90/07526, which are fully incorporated herein by reference. As used herein, "a linear or substantially linear ethylene polymer" means a homopolymer of ethylene or a copolymer of ethylene and one or more alpha-olefin comonomers having a linear backbone (i.e., no cross linking), a specific and limited amount of long-chain branching or no long-chain branching, a narrow molecular weight distribution, a narrow composition distribution (e.g., for alpha-olefin copolymers), or a combination thereof. More explanation of such polymers is discussed in U.S. Pat. No. 6,403,692, which is incorporated herein by reference for all purposes.

Preferred ethylene homopolymers and copolymers useful in this invention typically have:

1. an $M_W$ of 20,000 g/mol or more, 20,000 to 2,000,000 g/mol preferably 30,000 to 1,000,000, preferably 40,000 to 200,000, preferably 50,000 to 750,000, as measured by size exclusion chromatography according to the procedure described below in the Test Methods section; and/or
2. an $M_w/M_n$ of 1 to 40, preferably 1.6 to 20, more preferably 1.8 to 10, more preferably 1.8 to 4, preferably 8 to 25 as measured by size exclusion chromatography as described below in the Test Methods section; and/or
3. a $T_m$ of 30° C. to 150° C., preferably 30° C. to 140° C., preferably 50° C. to 140° C., more preferably 60° C. to 135° C. as determined by the DSC method described below in the Test Methods section; and/or
4. a crystallinity of 5% to 80%, preferably 10% to 70%, more preferably 20% to 60% (alternatively, the polyethylene may have a crystallinity of at least 30%, preferably at least 40%, alternatively at least 50%, where crystallinity is determined by the DSC method described below in the Test Methods section); and/or
5. a heat of fusion of 300 J/g or less, preferably 1 to 260 J/g, preferably 5 to 240 J/g, preferably 10 to 200 J/g as measured by the DSC method described below in the Test Methods section; and/or
6. a crystallization temperature (Tc) of 15° C. to 130° C., preferably 20° C. to 120° C., preferably 25° C. to 110° C., preferably 60° C. to 125° C., as measured by the method described below in the Test Methods section; and/or
7. a heat deflection temperature of 30° C. to 120° C., preferably 40° C. to 100° C., more preferably 50° C. to 80° C. as measured according to ASTM D648 on injection molded flexure bars, at 66 psi load (455 kPa); and/or
8. a Shore hardness (D scale) of 10 or more, preferably 20 or more, preferably 30 or more, preferably 40 or more, preferably 100 or less, preferably from 25 to 75 (as measured by ASTM D 2240); and/or
9. a percent amorphous content of at least 50%, alternatively at least 60%, alternatively at least 70%, even alternatively between 50% and 95%, or 70% or less, preferably 60% or less, preferably 50% or less, as determined by subtracting the percent crystallinity from 100 as described in the Test Methods section below; and/or
10. a branching index ($g'_{vis}$) of 0.97 or more, preferably 0.98 or more, preferably 0.99 or more, preferably 1, as measured using the method described below in the Test Methods section; and/or
11. a density of 0.860 to 0.980 g/cc (preferably from 0.880 to 0.940 g/cc, preferably from 0.900 to 0.935 g/cc, preferably from 0.910 to 0.930 g/cc) (alternately from 0.85 to 0.97 g/cm$^3$, preferably 0.86 to 0.965 g/cm$^3$, preferably 0.88 to 0.96 g/cm$^3$, alternatively between 0.860 and 0.910 g/cm$^3$, alternatively between 0.910 and 0.940 g/cm$^3$, or alternatively between 0.94 to 0.965 g/cm$^3$) (determined according to ASTM D 1505 using a density-gradient column on a compression-molded specimen that has been slowly cooled to room temperature (i.e., over a period of 10 minutes or more) and allowed to age for a sufficient time that the density is constant within +/−0.001 g/cm$^3$).

The polyethylene may be an ethylene homopolymer, such as HDPE. In another embodiment, the ethylene homopolymer has a molecular weight distribution ($M_w/M_n$) of up to 40, preferably ranging from 1.5 to 20, from 1.8 to 10 in another embodiment, from 1.9 to 5 in yet another embodiment, and from 2.0 to 4 in yet another embodiment. In another embodiment, the 1% secant flexural modulus (determined according to ASTM D790A, where test specimen geometry is as specified under the ASTM D790 section "Molding Materials (Thermoplastics and Thermosets)," and the support span is 2 inches (5.08 cm)) of the ethylene polymer falls in a range of 200 to 1000 MPa, and from 300 to 800 MPa in another embodiment, and from 400 to 750 MPa in yet another embodiment, wherein a desirable polymer may exhibit any combination of any upper flexural modulus limit with any lower flexural modulus limit. The melt index (MI) of preferred ethylene homopolymers range from 0.05 to 800 dg/min in one embodiment, and from 0.1 to 100 dg/min in another embodiment, as measured according to ASTM D1238 (190° C., 2.16 kg).

In a preferred embodiment, the polyethylene comprises less than 20 mol % propylene units (preferably less than 15 mol %, preferably less than 10 mol %, preferably less than 5 mol %, preferably 0 mol % propylene units).

In another embodiment of the invention, the ethylene polymer is an ethylene copolymer, either random, or block, of ethylene and one or more comonomers selected from $C_3$ to $C_{20}$ α-olefins, typically from $C_3$ to $C_{10}$ α-olefins in another embodiment. Preferably, the comonomers are present from 0.1 wt % to 50 wt % of the copolymer in one embodiment, from 0.5 wt % to 30 wt % in another embodiment, from 1 wt % to 15 wt % in yet another embodiment, and from 0.1 wt % to 5 wt % in yet another embodiment, wherein a desirable copolymer comprises ethylene and $C_3$ to $C_{20}$ α-olefin derived units in any combination of any upper wt % limit with any lower wt % limit described herein. Preferably, the ethylene copolymer will have a weight average molecular weight of from greater than 8,000 g/mol in one embodiment, greater than 10,000 g/mol in another embodiment, greater than 12,000 g/mol in yet another embodiment, greater than 20,000 g/mol in yet another embodiment, less than 1,000,000 g/mol in yet another embodiment, and less than 800,000 g/mol in yet another embodiment, wherein a desirable copolymer may comprise any upper molecular weight limit with any lower molecular weight limit described herein.

In another embodiment, the ethylene copolymer comprises ethylene and one or more other monomers selected from the group consisting of $C_3$ to $C_{20}$ linear, branched or cyclic monomers, and in some embodiments is a $C_3$ to $C_{12}$ linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. The monomers may be present at up to 50 wt %, preferably from 0 wt % to 40 wt %, more preferably from 0.5 wt % to 30 wt %, more preferably from 2 wt % to 30 wt %, more preferably from 5 wt % to 20 wt %.

Preferred linear alpha-olefins useful as comonomers for the ethylene copolymers useful in this invention include $C_3$ to $C_8$ alpha-olefins, more preferably 1-butene, 1-hexene, and 1-octene, even more preferably 1-hexene. Preferred branched alpha-olefins include 4-methyl-1-pentene, 3-methyl-1-pentene, and 3,5,5-trimethyl-1-hexene, 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene, and allyl benzene.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes ($M_W$ less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

In a particularly desirable embodiment, the ethylene polymer used herein is a plastomer having a density of 0.91 g/cm³ or less, as determined by ASTM D1505, and a melt index (MI) between 0.1 and 50 dg/min, as determined by ASTM D1238 (190° C., 2.16 kg). In one embodiment, the useful plastomer is a copolymer of ethylene and at least one $C_3$ to $C_{12}$ α-olefin, preferably $C_4$ to $C_8$ α-olefins. The amount of $C_3$ to $C_{12}$ α-olefin present in the plastomer ranges from 2 wt % to 35 wt % in one embodiment, from 5 wt % to 30 wt % in another embodiment, from 15 wt % to 25 wt % in yet another embodiment, and from 20 wt % to 30 wt % in yet another embodiment.

Preferred plastomers useful in the invention have a melt index of between 0.1 and 40 dg/min in one embodiment, from 0.2 to 20 dg/min in another embodiment, and from 0.5 to 10 dg/min in yet another embodiment. The average molecular weight of preferred plastomers ranges from 10,000 to 800,000 g/mol in one embodiment, and from 20,000 to 700,000 g/mol in another embodiment. The 1% secant flexural modulus (ASTM D790A Flexural properties at room temperature are determined according to ASTM D790A, test specimen geometry was as specified under the ASTM D790 section "Molding Materials (Thermoplastics and Thermosets)," and the support span was 2 inches (5.08 cm)) of preferred plastomers ranges from 5 MPa to 100 MPa in one embodiment, and from 10 MPa to 50 MPa in another embodiment. Further, preferred plastomers that are useful in compositions of the present invention have a melting temperature ($T_m$) of from 30° C. to 100° C. in one embodiment, and from 40° C. to 80° C. in another embodiment. The degree of crystallinity of preferred plastomers is between 3% and 30%.

Particularly preferred plastomers useful in the present invention are synthesized using a single-site catalyst, such as a metallocene catalyst, and comprise copolymers of ethylene and higher α-olefins such as propylene, 1-butene, 1-hexene and 1-octene, and which contain enough of one or more of these comonomer units to yield a density between 0.86 and 0.91 g/cm³ in one embodiment. The molecular weight distribution ($M_w/M_n$) of desirable plastomers ranges from 1.5 to 5 in one embodiment and from 2.0 to 4 in another embodiment. Examples of commercially available plastomers are EXACT™ 4150, a copolymer of ethylene and 1-hexene, the 1-hexene derived units making up from 18 wt % to 22 wt % of the plastomer, having a density of 0.895 g/cm³, and MI of 3.5 dg/min (ExxonMobil Chemical Company, Houston, Tex.); and EXACT™ 8201, a copolymer of ethylene and 1-octene, the 1-octene derived units making up from 26 wt % to 30 wt % of the plastomer, having a density of 0.882 g/cm³, and MI of 1.0 dg/min (ExxonMobil Chemical Company, Houston, Tex.).

The melt index (MI) of preferred ethylene polymers, as measured according to ASTM D1238 (190° C., 2.16 kg), ranges from 0.02 dg/min to 800 dg/min in one embodiment, from 0.05 to 500 dg/min in another embodiment, and from 0.1 to 100 dg/min in another embodiment. In another embodiment of the present invention, the polyethylene has a MI of 20 dg/min or less, 7 dg/min or less, 5 dg/min or less, or 2 dg/min or less, or less than 2 dg/min. In yet another embodiment, the polymer has a Mooney viscosity, ML(1+4) @125° C. (measured according to ASTM D1646) of 100 or less, 75 or less, 60 or less, or 30 or less.

In yet another embodiment, the 1% secant flexural modulus of preferred ethylene polymers ranges from 5 MPa to 1000 MPa, from 10 MPa to 800 MPa in another embodiment, and from 5 MPa to 200 MPa in yet another embodiment, wherein a desirable polymer may exhibit any combination of any upper flexural modulus limit with any lower flexural modulus limit.

The crystallinity of the polymer may also be expressed in terms of crystallinity percent. The thermal energy for the highest order of polyethylene is estimated at 290 J/g. That is, 100% crystallinity is equal to 290 J/g. Preferably, the polymer has a crystallinity (as determined by DSC as described in the Test methods section below) within the range having an upper limit of 80%, 60%, 40%, 30%, or 20% and a lower limit of 1%, 3%, 5%, 8%, or 10%. Alternately, the polymer has a crystallinity of 5% to 80%, preferably 10% to 70%, more preferably 20% to 60%. (Alternatively, the polyethylene may have a crystallinity of at least 30%, preferably at least 40%, alternatively at least 50%, where crystallinity is determined.

The level of crystallinity may be reflected in the melting point. In one embodiment of the present invention, the ethylene polymer has a single melting point. Typically, a sample of ethylene copolymer will show secondary melting peaks adjacent to the principal peak, which is considered together as a single melting point. The highest of these peaks is considered the melting point. The polymer preferably has a melting point (as determined by DSC as described in the Test methods section below) ranging from an upper limit of 150° C., 130° C., or 100° C. to a lower limit of 0° C., 30° C., 35° C., 40° C., or 45° C.

Preferred ethylene copolymers useful herein are preferably a copolymer comprising at least 50 wt % ethylene and having up to 50 wt %, preferably 1 wt % to 35 wt %, even more preferably 1 wt % to 6 wt % of a $C_3$ to $C_{20}$ comonomer (preferably hexene or octene), based upon the weight of the copolymer. The polyethylene copolymers preferably have a composition distribution breadth index (CDBI) of 60% or more, preferably 60% to 80%, preferably 65% to 80%. In another preferred embodiment, the ethylene copolymer has a density of 0.910 to 0.950 g/cm³ (preferably 0.915 to 0.940 g/cm³, preferably 0.918 to 0.925 g/cm³) and a CDBI of 60% to 80%, preferably between 65% and 80%. Preferably, these polymers are metallocene polyethylenes (mPEs).

Further useful mPEs include those described in US 2007/0260016 and U.S. Pat. No. 6,476,171, e.g., copolymers of an ethylene and at least one alpha olefin having at least 5 carbon atoms obtainable by a continuous gas phase polymerization using supported catalyst of an activated molecularly discrete catalyst in the substantial absence of an aluminum alkyl based scavenger (e.g., triethylaluminum, trimethylaluminum, tri-isobutyl aluminum, tri-n-hexylaluminum, and the like), which polymer has a Melt Index of from 0.1 to 15 (ASTM D 1238, condition E); a CDBI of at least 70%; a density of from 0.910 to 0.930 g/cc; a Haze (ASTM D1003) value of less than 20; a Melt Index ratio (I21/I1, ASTMD 1238) of from 35 to 80; an averaged Modulus (M) (as defined in U.S. Pat. No. 6,255,426) of from 20,000 to 60,000 psi (13790 to 41369 N/cm²); and a relation between M and the Dart Impact Strength (26 inch, ASTM D 1709) in g/mil (DIS) complying with the formula:

$$DIS \geq 0.8 \times [100 + e^{(11.71 - 0.000268 \times M + 2.183 \times 10^{-9} \times M^2)}],$$

where "e" represents 2.1783, the base Napierian logarithm, M is the averaged Modulus in psi, and DIS is the 26 inch (66 cm) dart impact strength.

Useful mPE homopolymers or copolymers may be produced using mono- or bis-cyclopentadienyl transition metal catalysts in combination with an activator of alumoxane and/or a non-coordinating anion in solution, slurry, high pressure, or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Baytown, Tex. under the tradename EXCEED™ Polyethylene or ENABLE™ Polyethylene.

Additives

The polyethylene compositions of the present invention may also contain other additives. Those additives include antioxidants, nucleating agents, acid scavengers, stabilizers, anticorrosion agents, plasticizers, blowing agents, cavitating agents, surfactants, adjuvants, block, antiblock, UV absorbers such as chain-breaking antioxidants, oils, etc., quenchers, antistatic agents, slip agents, processing aids, UV stabilizers, neutralizers, lubricants, waxes, color masterbatches, pigments, dyes and fillers, and cure agents such as peroxide. In a preferred embodiment, the additives may each individually present at 0.01 wt % to 50 wt % in one embodiment, from 0.01 wt % to 10 wt % in another embodiment, and from 0.1 wt % to 6 wt % in another embodiment, based upon the weight of the composition. In a preferred embodiment, dyes and other colorants common in the industry may be present from 0.01 wt % to 10 wt % in one embodiment, and from 0.1 wt % to 6 wt % in another embodiment, based upon the weight of the composition. Preferred fillers, cavitating agents and/or nucleating agents include titanium dioxide, calcium carbonate, barium sulfate, silica, silicon dioxide, carbon black, sand, glass beads, mineral aggregates, talc, clay, and the like.

In particular, antioxidants and stabilizers such as organic phosphites, hindered amines, and phenolic antioxidants may be present in the polyethylene compositions of the invention from 0.001 wt % to 2 wt %, based upon the weight of the composition, in one embodiment, from 0.01 wt % to 0.8 wt % in another embodiment, and from 0.02 wt % to 0.5 wt % in yet another embodiment. Non-limiting examples of organic phosphites that are suitable are tris(2,4-di-tert-butylphenyl)phosphite (IRGAFOS 168), and di(2,4-di-tert-butylphenyl)pentaerithritol diphosphite (ULTRANOX 626). Non-limiting examples of hindered amines include poly[2-N,N'-di(2,2,6,6-tetramethyl-4-piperidinyl)-hexanediamine-4-(1-amino-1,1,3,3-tetramethylbutane)sym-triazine] (CHIMASORB 944) and bis(1,2,2,6,6-pentamethyl-4-piperidyl) sebacate (TINUVIN 770). Non-limiting examples of phenolic antioxidants include pentaerythrityl tetrakis(3,5-di-tert-butyl-4-hydroxyphenyl) propionate (IRGANOX 1010) and 1,3,5-Tri(3,5-di-tert-butyl-4-hydroxybenzyl-isocyanurate (IRGANOX 3114).

Fillers may be present from 0.001 wt % to 50 wt %, based upon the weight of the composition, in one embodiment, from 0.01 wt % to 25 wt % in another embodiment, and from 0.2 wt % to 10 wt % in yet another embodiment. Desirable fillers include but are not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe, and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art and may have the modifier of the invention pre-contacted or pre-absorbed into the filler prior to addition to the ethylene polymer in one embodiment.

Metal salts of fatty acids may also be present in the polyethylene compositions of the present invention. Such salts may be present from 0.001 wt % to 1 wt % of the composition in one embodiment and from 0.01 wt % to 0.8 wt % in another embodiment. Examples of fatty acids include lauric acid, stearic acid, succinic acid, stearyl lactic acid, lactic acid, phthalic acid, benzoic acid, hydroxystearic acid, ricinoleic acid, naphthenic acid, oleic acid, palmitic acid, erucic acid, or any monocarboxylic aliphatic saturated or unsaturated acid having a chain length of 7 to 22 carbon atoms. Suitable metals including Li, Na, Mg, Ca, Sr, Ba, Zn, Cd, Al, Sn, Pb, and so forth. Preferably, metal salts of fatty acids are magnesium stearate, calcium stearate, sodium stearate, zinc stearate, calcium oleate, zinc oleate, and magnesium oleate.

In a preferred embodiment, slip additives may be present in the compositions of this invention. Preferably, the slip additives are present at 0.001 wt % to 1 wt % (10 ppm to 10,000 ppm), more preferably 0.01 wt % to 0.5 wt % (100 ppm to 5000 ppm), and more preferably 0.1 wt % to 0.3 wt % (1000 ppm to 3000 ppm), based upon the weight of the composition. Desirable slip additives include, but are not limited to, saturated fatty acid amides (such as palmitamide, stearamide, arachidamide, behenamide, stearyl stearamide, palmityl pamitamide, and stearyl arachidamide); saturated ethylene-bis-amides (such as stearamido-ethyl-stearamide, stearamido-ethyl-palmitamide, and palmitamido-ethyl-stearamide); unsaturated fatty acid amides (such as oleamide, erucamide, and linoleamide); unsaturated ethylene-bis-amides (such as ethylene-bis-stearamide, ethylene-bis-oleamide, stearyl-erucamide, erucamido-ethyl-erucamide, oleamido-ethyl-oleamide, erucamido-ethyl-oleamide, oleamido-ethyl-lerucamide, stearamido-ethyl-erucamide, erucamido-ethyl-palmitamide, and palmitamido-ethyl-oleamide); glycols; polyether polyols (such as Carbowax); acids of aliphatic hydrocarbons (such as adipic acid and sebacic acid); esters of aromatic or aliphatic hydrocarbons (such as glycerol monostearate and pentaerythritol monooleate); styrene-alpha-methyl styrene; fluoro-containing polymers (such as polytetrafluoroethylene, fluorine oils, and fluorine waxes); silicon compounds (such as silanes and silicone polymers, including silicone oils, modified silicones, and cured silicones); sodium alkylsulfates, alkyl phosphoric acid esters; and mixtures thereof. Preferred slip additives are unsaturated fatty acid amides, which are commercially available from Crompton (Kekamide™ grades), Croda Universal (Crodamide™ grades), and Akzo Nobel Amides Co. Ltd. (ARMOSLIP™ grades). Particularly preferred slip agents include unsaturated fatty acid amides having the chemical structure:

where x is 5 to 15. Preferred versions include: 1) Erucamide, where x is 11, also referred to as cis-13-docosenoamide (commercially available as ARMOSLIP E); 2) Oleylamide, where x is 8; and 3) Oleamide, where x is 7, also referred to as N-9-octadecenyl-hexadecanamide. In another embodiment, stearamide is also useful in this invention. Other preferred slip additives include those described in WO 2004/005601A1.

In some embodiments, the polyethylene compositions produced by this invention may be blended with one or more other polymers, including but not limited to, thermoplastic polymer(s) and/or elastomer(s).

By "thermoplastic polymer(s)" is meant a polymer that can be melted by heat and then cooled without appreciable change in solid-state properties before and after heating. Thermoplastic polymers typically include, but are not limited to, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Preferred polyolefins include, but are not limited to, polymers comprising one or more linear, branched or cyclic $C_2$ to $C_{40}$ olefins, preferably polymers comprising ethylene copolymerized with one or more $C_3$ to $C_{40}$ olefins, preferably a $C_3$ to $C_{20}$ alpha olefin, more preferably $C_3$ to $C_{10}$ alpha-olefins. A particularly preferred example is polybutene. The most preferred polyolefin is polypropylene. Other preferred polyolefins include, but are not limited to, polymers comprising ethylene including but not limited to ethylene copolymerized with a $C_3$ to $C_{40}$ olefin, preferably a $C_3$ to $C_{20}$ alpha olefin, more preferably propylene, butene, hexene, and/or octene.

By "elastomers" is meant all natural and synthetic rubbers, including those defined in ASTM D1566. Examples of preferred elastomers include, but are not limited to, ethylene propylene rubber, ethylene propylene diene monomer rubber, styrenic block copolymer rubbers (including SEBS, SI, SIS, SB, SBS, SIBS, and the like, where S=styrene, EB=random ethylene+butene, I=isoprene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, and polybutadiene rubber (both cis and trans).

In another embodiment, the blend comprising the modifier may further be combined with one or more polymers polymerizable by a high-pressure free radical process, polyvinylchloride, polybutene-1, isotactic polybutene, ABS resins, block copolymer, styrenic block copolymers, polyamides, polycarbonates, PET resins, crosslinked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

Tackifiers may be blended with the ethylene compositions of this invention. Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments, the tackifier is hydrogenated. In other embodiments, the tackifier is non-polar. (Non-polar meaning that the tackifier is substantially free of monomers having polar groups. Preferably, the polar groups are not present; however, if they are, preferably they are not present at more that 5 wt %, preferably not more that 2 wt %, even more preferably no more than 0.5 wt %, based upon the weight of the tackifier.) In some embodiments, the tackifier has a softening point (Ring and Ball, as measured by ASTM E-28) of 80° C. to 140° C., preferably 100° C. to 130° C. The tackifier, if present, is typically present at about 1 wt % to about 50 wt %, based upon the weight of the blend, more preferably 10 wt % to 40 wt %, even more preferably 20 wt % to 40 wt %. Preferably, however, tackifier is not present, or if present, is present at less than 10 wt %, preferably less than 5 wt %, more preferably at less than 1 wt %.

Blending and Processing

The compositions and blends described herein may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; antiblocking agents; release agents; anti-static agents; pigments; colorants; dyes; waxes; silica; fillers; talc; and the like.

The polymers suitable for use in the present invention can be in any physical form when used to blend with the modifier of the invention. In one embodiment, reactor granules, defined as the granules of polymer that are isolated from the polymerization reactor prior to any processing procedures, are used to blend with the modifier of the invention. The reactor granules typically have an average diameter of from 50 μm to 10 mm in one embodiment and from 10 μm to 5 mm in another embodiment. In another embodiment, the polymer is in the form of pellets, such as, for example, having an average diameter of from 1 mm to 10 mm that are formed from melt extrusion of the reactor granules.

The components of the present invention can be blended by any suitable means, and are typically blended to yield an intimately mixed composition which may be a homogeneous, single phase mixture. For example, they may be blended in a static mixer, batch mixer, extruder, or a combination thereof, that is sufficient to achieve an adequate dispersion of modifier in the polymer.

The mixing step may involve first dry blending using, for example, a tumble blender, where the polymer and modifier are brought into contact first, without intimate mixing, which may then be followed by melt blending in an extruder. Another method of blending the components is to melt blend the polymer pellets with the modifier directly in an extruder or batch mixer. It may also involve a "master batch" approach, where the final modifier concentration is achieved by combining neat polymer with an appropriate amount of modified polymer that had been previously prepared at a higher modifier concentration. The mixing step may take place as part of a processing method used to fabricate articles, such as in the extruder on an injection molding machine or blown-film line or fiber line.

In a preferred aspect of the invention, the ethylene polymer and modifier are "melt blended" in an apparatus such as an extruder (single or twin screw) or batch mixer. The ethylene polymer may also be "dry blended" with the modifier using a tumbler, double-cone blender, ribbon blender, or other suitable blender. In yet another embodiment, the ethylene polymer and modifier are blended by a combination of approaches, for example, a tumbler followed by an extruder. A preferred method of blending is to include the final stage of blending as part of an article fabrication step, such as in the extruder used to melt and convey the composition for a molding step like injection molding or blow molding. This could include direct injection of the modifier into the extruder, either before or after the polyethylene is fully melted. Extrusion technology for polyethylene is described in more detail in, for example, PLASTICS EXTRUSION TECHNOLOGY 26-37 (Friedhelm Hensen, ed. Hanser Publishers 1988).

In another aspect of the invention, the polyethylene composition may be blended in solution by any suitable means, by using a solvent that dissolves both components to a significant extent. The blending may occur at any temperature or pressure where the modifier and the ethylene polymer remain in solution. Preferred conditions include blending at high temperatures, such as 10° C. or more, preferably 20° C. or more over the melting point of the ethylene polymer. Such solution blending would be particularly useful in processes where the ethylene polymer is made by solution process and the modifier is added directly to the finishing train, rather than added to the dry polymer in another blending step altogether. Such solution blending would also be particularly useful in processes where the ethylene polymer is made in a bulk or high pressure process where both the polymer and the modifier were soluble in the monomer. As with the solution process the modifier is added directly to the finishing train, rather than added to the dry polymer in another blending step altogether.

Thus, in the cases of fabrication of articles using methods that involve an extruder, such as injection molding or blow molding, any means of combining the polyethylene and modifier to achieve the desired composition serve equally well as fully formulated pre-blended pellets, since the forming process includes a re-melting and mixing of the raw material; example combinations include simple blends of neat polymer pellets and modifier, of neat polymer granules and modifier, of neat polymer pellets and pre-blended pellets, and neat polymer granules and pre-blended pellets. Here, "pre-blended pellets" means pellets of a polyethylene composition comprising ethylene polymer and modifier at some concentration. In the process of compression molding, however, little mixing of the melt components occurs and pre-blended pellets would be preferred over simple blends of the constituent pellets (or granules) and modifier. Those skilled in the art will be able to determine the appropriate procedure for blending of the polymers to balance the need for intimate mixing of the component ingredients with the desire for process economy.

Applications

The enhanced properties of the polyethylene compositions described herein are useful in a wide variety of applications, including transparent articles such as cook and storage ware, and in other articles such as furniture, automotive components, toys, sportswear, medical devices, sterilizable medical devices and sterilization containers, non-woven fibers and fabrics and articles therefrom such as drapes, gowns, filters, hygiene products, diapers, and films, oriented films, sheets, tubes, pipes and other items where softness, high impact strength, and impact strength below freezing is important.

Additional examples of desirable articles of manufacture made from compositions of the invention include films, sheets, fibers, woven and nonwoven fabrics, automotive components, furniture, sporting equipment, food storage containers, transparent and semi-transparent articles, toys, tubing and pipes, sheets, packaging, bags, sacks, coatings, caps, closures, crates, pallets, cups, non-food containers, pails, insulation, and medical devices. Further examples include automotive components, wire and cable jacketing, pipes, agricultural films, geomembranes, toys, sporting equipment, medical devices, casting and blowing of packaging films, extrusion of tubing, pipes and profiles, sporting equipment, outdoor furniture (e.g., garden furniture) and playground equipment, boat and water craft components, and other such articles. In particular, the compositions are suitable for automotive components such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

Other useful articles and goods may be formed economically by the practice of our invention including: crates; containers; packaging; labware, such as roller bottles for culture growth and media bottles; office floor mats; instrumentation sample holders and sample windows; liquid storage containers such as bags, pouches, and bottles for storage and IV infusion of blood or solutions; packaging material including those for any medical device or drugs including unit-dose; or other blister or bubble pack as well as for wrapping or containing food preserved by irradiation. Other useful items include medical tubing and valves for any medical device including infusion kits, catheters, and respiratory therapy, as well as packaging materials for medical devices or food which is irradiated including trays, as well as stored liquid, particularly water, milk, or juice, containers including unit servings and bulk storage containers as well as transfer means such as tubing, pipes, and such.

Fabrication of these articles may be accomplished by injection molding, extrusion, thermoforming, blow molding, rotational molding (rotomolding), fiber spinning, spin bonding or melt blown bonding such as for non-woven fabrics, film blowing, stretching for oriented films, casting such as for films (including use of chill rolls), profile deformation, coating (film, wire, and cable), compression molding, calendering, foaming, laminating, transfer molding, cast molding, pultrusion, protrusion, draw reduction, and other common processing methods, or combinations thereof, such as is known in the art and described in, for example, PLASTICS PROCESSING (Radian Corporation, Noyes Data Corp. 1986). Use of at least thermoforming or film applications allows for the possibility of and derivation of benefits from uniaxial or biaxial orientation. Sufficient mixing should take place to assure that an intimately mixed, preferably uniform, blend will be produced prior to conversion into a finished product.

Adhesives

The polymers of this invention or blends thereof can be used as adhesives, either alone or combined with tackifiers. Preferred tackifiers are described above. The tackifier is typically present at about 1 wt % to about 50 wt %, based upon the weight of the blend, more preferably 10 wt % to 40 wt %, even more preferably 20 wt % to 40 wt %. Other additives, as described above, may be added also.

The adhesives of this invention can be used in any adhesive application, including but not limited to, disposables, packaging, laminates, pressure sensitive adhesives, tape labels, wood binding, paper binding, non-wovens, road marking, reflective coatings, and the like. In a preferred embodiment, the adhesives of this invention can be used for disposable diaper and napkin chassis construction, elastic attachment in disposable goods converting, packaging, labeling, bookbinding, woodworking, and other assembly applications. Particularly preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

Films

The compositions described above and the blends thereof may be formed into monolayer or multilayer films. These films may be formed by any of the conventional techniques known in the art including extrusion, co-extrusion, extrusion coating, lamination, blowing, and casting. The film may be obtained by the flat film or tubular process which may be followed by orientation in a uniaxial direction or in two mutually perpendicular directions in the plane of the film. One or more of the layers of the film may be oriented in the transverse and/or longitudinal directions to the same or different extents. This orientation may occur before or after the individual layers are brought together. For example a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15 preferably 7 to 9. However, in another embodiment, the film is oriented to the same extent in both the MD and TD directions.

In multilayer constructions, the other layer(s) may be any layer typically included in multilayer film structures. For example, the other layer or layers may be:

1. Polyolefins.

Preferred polyolefins include homopolymers or copolymers of $C_2$ to $C_{40}$ olefins, preferably $C_2$ to $C_{20}$ olefins, preferably a copolymer of an alpha-olefin and another olefin or alpha-olefin (ethylene is defined to be an alpha-olefin for purposes of this invention). Preferably homopolyethylene, homopolypropylene, propylene copolymerized with ethylene and/or butene, ethylene copolymerized with one or more of propylene, butene, or hexene, and optional dienes. Preferred examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene, and ethylene, and/or butene, and/or hexene, elastomers such as ethylene propylene rubber, ethylene propylene diene monomer rubber, neoprene, and blends of thermoplastic polymers and elastomers, such as, for example, thermoplastic elastomers and rubber toughened plastics.

2. Polar Polymers.

Preferred polar polymers include homopolymers and copolymers of esters, amides, acetates, anhydrides, copolymers of a $C_2$ to $C_{20}$ olefin, such as ethylene, and/or propylene, and/or butene with one or more polar monomers such as acetates, anhydrides, esters, alcohol, and/or acrylics. Preferred examples include polyesters, polyamides, ethylene vinyl acetate copolymers, and polyvinyl chloride.

3. Cationic Polymers.

Preferred cationic polymers include polymers or copolymers of geminally disubstituted olefins, alpha-heteroatom olefins, and/or styrenic monomers. Preferred geminally disubstituted olefins include isobutylene, isopentene, isoheptene, isohexane, isooctene, isodecene, and isododecene. Preferred alpha-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-alpha-methyl styrene.

4. Miscellaneous.

Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbonded fibers, and non-wovens (particularly polypropylene spunbonded fibers or non-wovens), and substrates coated with inks, dyes, pigments, and the like.

The films may vary in thickness depending on the intended application; however, films of a thickness from 1 μm to 250 μm are usually suitable. Films intended for packaging are usually from 10 to 60 micron thick. The thickness of the sealing layer is typically 0.2 μm to 50 μm. There may be a sealing layer on both the inner and outer surfaces of the film or the sealing layer may be present on only the inner or the outer surface.

Additives such as block, antiblock, antioxidants, pigments, fillers, processing aids, UV stabilizers, neutralizers, lubricants, surfactants, and/or nucleating agents may also be present in one or more than one layer in the films. Preferred additives include silicon dioxide, titanium dioxide, polydimethylsiloxane, talc, dyes, wax, calcium sterate, carbon black, low molecular weight resins, and glass beads, preferably these additives are present at from 0.1 ppm to 1000 ppm.

In another embodiment, one more layers may be modified by corona treatment, electron beam irradiation, gamma irradiation, or microwave irradiation. In a preferred embodiment, one or both of the surface layers is modified by corona treatment.

The films described herein may also comprise from 5 wt % to 60 wt %, based upon the weight of the polymer and the resin, of a hydrocarbon resin. The resin may be combined with the polymer of the seal layer(s) or may be combined with the polymer in the core layer(s). The resin preferably has a softening point above 100° C., even more preferably from 130° C. to 180° C. Preferred hydrocarbon resins include those described above. The films comprising a hydrocarbon resin may be oriented in uniaxial or biaxial directions to the same or different degrees. For more information on blends of tackifiers and modifiers useful herein, see U.S. Ser. No. 60/617,594, filed Oct. 8, 2004.

The films described above may be used as stretch and/or cling films. Stretch/cling films are used in various bundling, packaging, and palletizing operations. To impart cling properties to, or improve the cling properties of, a particular film, a number of well-known tackifying additives have been utilized. Common tackifying additives include polybutenes, terpene resins, alkali metal stearates, and hydrogenated rosins and rosin esters. The cling properties of a film can also be modified by the well-known physical process referred to as corona discharge. Some polymers (such as ethylene methyl acrylate copolymers) do not need cling additives and can be used as cling layers without tackifiers. Stretch/cling films may comprise a slip layer comprising any suitable polyolefin or combination of polyolefins such as polyethylene, polypropylene, copolymers of ethylene and propylene, and polymers obtained from ethylene and/or propylene copolymerized with minor amounts of other olefins, particularly $C_4$ to $C_{12}$ olefins. Particularly preferred is linear low density polyethylene (LLDPE). Additionally, the slip layer may include one or more anticling (slip and/or antiblock) additives which may be added during the production of the polyolefin or subsequently blended in to improve the slip properties of this layer. Such additives are well-known in the art and include, for example, silicas, silicates, diatomaceous earths, talcs, and various lubricants. These additives are preferably utilized in amounts ranging from about 100 ppm to about 20,000 ppm, more preferably between about 500 ppm to about 10,000 ppm, by weight based upon the weight of the slip layer. The slip layer may, if desired, also include one or more other additives as described above.

In another embodiment of the invention, films comprising blends described herein have a gauge variation that is at least 10 percent lower than that of film of the same thickness and of the same composition, absent the modifier, prepared under the same conditions and a dart impact strength that is within 20 percent of a film of the same thickness and of the same composition, absent the modifier, prepared under the same conditions.

In another embodiment of the invention, films comprising blends described herein have a gauge variation that is at least 10 percent lower than that of a film of the same thickness and of the same composition, absent the modifier, prepared under the same conditions and a MD Tear strength that is within 20 percent of a film of the same thickness and of the same composition, absent the modifier, prepared under the same conditions.

In another embodiment of the invention, films comprising blends described herein have a haze that is at least 10% lower than that of a film of the same thickness and of the same composition, absent the modifier, prepared under the same conditions and a dart impact strength that is within 20% of a film of the same thickness and of the same composition, absent the modifier, prepared under the same conditions.

In another embodiment of the invention, films comprising blends described herein have a haze that is at least 10% lower than that of a film of the same thickness and of the same composition, absent the modifier, prepared under the same conditions and a MD Tear strength that is within 20% of a film of the same thickness and of the same composition, absent the modifier, prepared under the same conditions.

In another embodiment of the invention, films comprising blends described herein have a haze of 10% or less.

In another embodiment of the invention, films comprising blends described herein have a haze that is at least 10% less than the haze measured on a film of the same thickness and of the same composition, absent the dendritic hydrocarbon polymer modifier, prepared under the same conditions.

In another embodiment of the invention, films comprising blends described herein have a gauge variation that is at least 10% less than the gauge variation measured on a film of the same thickness and of the same composition, absent the dendritic hydrocarbon polymer modifier, prepared under the same conditions.

In another embodiment of the invention, films comprising blends described herein have a dart impact strength that is greater than or within 30% less than the dart impact strength measured on a film of the same thickness and of the same composition, absent the dendritic hydrocarbon polymer modifier, prepared under the same conditions.

In another embodiment of the invention, films comprising blends described herein have an MD Tear strength that is greater than or within 30% less than the MD Tear strength measured on a film of the same thickness and of the same composition, absent the dendritic hydrocarbon polymer modifier, prepared under the same conditions.

In another embodiment of the invention, films comprising blends described herein have a gauge variation that is at least 10% less than the gauge variation measured on a film of the same thickness and of the same composition, absent the dendritic hydrocarbon polymer modifier, prepared under the same conditions, and the film has a Dart Drop, in g/mil, that is within 30% of the Dart Drop measured on a film of the same thickness and of the same composition, absent the dendritic hydrocarbon polymer modifier, prepared under the same conditions.

In another embodiment of the invention, films comprising blends described herein have a gauge variation that is at least 10% less than the gauge variation measured on a film of the same thickness and of the same composition, absent the dendritic hydrocarbon polymer modifier, prepared under the same conditions, and the film has an MD Tear strength that is greater than or within 30% less than the MD Tear strength measured on a film of the same thickness and of the same composition, absent the dendritic hydrocarbon polymer modifier, prepared under the same conditions.

In another embodiment of the invention, films comprising blends described herein have a strain hardening ratio that is at least 10% greater than the strain hardening ratio measured on a composition, absent the dendritic hydrocarbon polymer modifier, and the film has a Dart Drop, in g/mil, that is within 30% of the Dart Drop measured on a film of the same thickness and of the same composition, absent the dendritic hydrocarbon polymer modifier, prepared under the same conditions.

In another embodiment of the invention, films comprising blends described herein have a gauge variation that is at least 10% less than the gauge variation measured on a film of the same thickness and of the same composition, absent the dendritic hydrocarbon polymer modifier, prepared under the same conditions, and the film has a haze that is at least 10% less than haze measured on a film of the same thickness and of the same composition, absent the dendritic hydrocarbon polymer modifier, prepared under the same conditions.

In a preferred embodiment, films prepared from the compositions described herein have improved bubble stability compared to the ethylene copolymers of the compositions alone, as determined by reduced gauge variation, e.g., a gauge variation of 10% or less, preferably 8% or less, preferably 5% or less.

In a preferred embodiment, films prepared from the compositions described herein have excellent optical properties, such as a haze (ASTM D1003) of 20 or less, preferably 15 or less, preferably 10 or less.

Molded and Extruded Products

The polyethylene composition described above may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

The compositions described herein may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. An embodiment of a thermoforming sequence is described; however, this should not be construed as limiting the thermoforming methods useful with the compositions of this invention. First, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool. Thermoforming is accomplished by vacuum, positive air pressure, plug-assisted vacuum forming, or combinations and variations of these, once the sheet of material reaches thermoforming temperatures, typically from 140° C. to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, the thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer, fast plug speeds generally provide the best material distribution in the part. The shaped laminate is then cooled in the mold. Sufficient cooling to maintain a mold temperature of 30° C. to 65° C. is desirable. The part is below 90° C. to 100° C. before ejection in one embodiment. The shaped laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING (Jacqueline I. Kroschwitz, ed., John Wiley & Sons 1990).

In yet another embodiment of the formation and shaping process, profile co-extrusion can be used. The profile co-extrusion process parameters are as above for the blow molding process, except the die temperatures (dual zone top and bottom) range from 150° C. to 235° C., the feed blocks are from 90° C. to 250° C., and the water cooling tank temperatures are from 10° C. to 40° C.

One embodiment of an injection molding process is described as follows. The shaped laminate is placed into the injection molding tool. The mold is closed and the substrate material is injected into the mold. The substrate material has a melt temperature between 180° C. and 300° C. in one embodiment, from 200° C. and 250° C. in another embodiment, and is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,000 kPa to 15,000 kPa. The mold is cooled between 10° C. and 70° C. to cool the substrate. The temperature will depend on the desired gloss and appearance desired. Typical cooling time is from 10 to 30 seconds, depending on part on the thickness. Finally, the mold is opened and the shaped composite article ejected.

Likewise, molded articles may be fabricated by injecting molten polymer blend into a mold that shapes and solidifies the molten polymer into desirable geometry and thickness of molded articles. A sheet may be made either by extruding a substantially flat profile from a die, onto a chill roll, or alternatively by calendering. Sheet will generally be considered to have a thickness of from 10 mils to 100 mils (254 μm to 2540 μm), although sheet may be substantially thicker. Tubing or pipe may be obtained by profile extrusion for uses in medical, potable water, land drainage applications, or the like. The profile extrusion process involves the extrusion of molten polymer through a die. The extruded tubing or pipe is then solidified by chill water or cooling air into a continuous extruded articles. The tubing will generally be in the range of from 0.31 cm to 2.54 cm in outside diameter and have a wall thickness of in the range of from 254 μm to 0.5 cm. The pipe will generally be in the range of from 2.54 cm to 254 cm in outside diameter and have a wall thickness of in the range of from 0.5 cm to 15 cm. Sheet made from the products of an embodiment of a version of the present invention may be used to form containers. Such containers may be formed by thermoforming, solid phase pressure forming, stamping, and other shaping techniques. Sheets may also be formed to cover floors or walls or other surfaces.

In an embodiment of the thermoforming process, the oven temperature is between 160° C. and 195° C., the time in the oven between 10 and 20 seconds, and the die temperature, typically a male die, between 10° C. and 71° C. The final thickness of the cooled (room temperature), shaped laminate is from 10 μm to 6000 μm in one embodiment, from 200 μm to 6000 μm in another embodiment, and from 250 μm to 3000 μm in yet another embodiment, and from 500 μm to 1550 μm in yet another embodiment, a desirable range being any combination of any upper thickness limit with any lower thickness limit.

In an embodiment of the injection molding process, wherein a substrate material is injection molded into a tool including the shaped laminate, the melt temperature of the substrate material is between 190° C. and 255° C. in one embodiment, and between 210° C. and 250° C. in another embodiment, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt any tie-layer material or backing layer to achieve adhesion between the layers.

In yet another embodiment of the invention, the compositions of this invention may be secured to a substrate material using a blow molding operation. Blow molding is particularly useful in such applications as for making closed articles such as fuel tanks and other fluid containers, playground equipment, outdoor furniture and small enclosed structures.

It will be understood by those skilled in the art that the steps outlined above may be varied, depending upon the desired result. For example, the extruded sheet of the compositions of this invention may be directly thermoformed or blow molded without cooling, thus skipping a cooling step. Other parameters may be varied as well in order to achieve a finished composite article having desirable features.

In another embodiment, this invention relates to:
1. A polyethylene blend comprising one or more ethylene polymers and one or more dendritic hydrocarbon polymer modifiers, wherein the modifier has: 1) a $g'_{vis}$ value less than 0.75; 2) a Cayley tree topology with a layer number of 2 or more; 3) optionally, an average Mw between the branch points of 1,500 g/mol or more; and 4) optionally, at least 0.6 ppm of silicon.
2. The composition of paragraph 1, wherein the modifier has 5 wt % or less of xylene insoluble material.
3. The composition of paragraph 1 or 2, wherein the complex viscosity at 0.1 $sec^{-1}$ of the modifier is equal to or greater than the complex viscosity at 0.1 $sec^{-1}$ of the polyethylene prior to combination with the modifier.
4. The composition of paragraph 1, 2, or 3, wherein the modifier is present at 0.25 wt % to 20 wt %, based upon the weight of the blend.
5. The composition of any of paragraphs 1 to 4, wherein the polyethylene comprises a copolymer of ethylene and one or more $C_3$ to $C_{20}$ alphaolefins and has an $M_W$ of 20,000 to 1,000,000 g/mol.
6. The composition of any of paragraphs 1 to 5, wherein the polyethylene has a density of 0.87 to 0.96 $g/cm^3$.
7. The composition of any of paragraphs 1 to 6, wherein the modifier is present from 0.1 wt % to 5 wt %, (based upon the weight of the blend); and the polyethylene has a composition distribution breadth index of 60% or more and a density of 0.90 g/cc or more.
8. The modifier of any of paragraphs 1 to 7, wherein the modifier has a strain-hardening ratio of 2 or more and the blend has a strain hardening ratio of greater than 1.0.
9. A polyethylene film comprising the blend of any of paragraphs 1 to 8, said film having a gauge variation that is at least 10% lower than that of a film of the same thickness and of the same composition, absent the modifier, prepared under the same conditions and a dart impact strength that is within 20% of a film of the same thickness and of the same composition, absent the modifier, prepared under the same conditions.
10. A polyethylene film comprising the blend of any of paragraphs 1 to 9, said film having a gauge variation that is at least 10% lower than that of a film of the same thickness and of the same composition, absent the modifier, prepared under the same conditions and a MD Tear strength that is within 20% of a film of the same thickness and of the same composition, absent the modifier, prepared under the same conditions.

11. A polyethylene film comprising the blend of any of paragraphs 1 to 10, said film having a haze that is at least 10% lower than that of a film of the same thickness and of the same composition, absent the modifier, prepared under the same conditions and a dart impact strength that is within 20% of a film of the same thickness and of the same composition, absent the modifier, prepared under the same conditions.

12. A polyethylene film comprising the blend of any of paragraphs 1 to 11, said film having a haze that is at least 10% lower than that of a film of the same thickness and of the same composition, absent the modifier, prepared under the same conditions and a MD Tear strength that is within 20% of a film of the same thickness and of the same composition, absent the modifier, prepared under the same conditions.

13. A film comprising the composition of any of paragraphs 1 to 12, said film having a haze of 10% or less.

14. A film comprising the composition of any of paragraphs 1 to 13, wherein the film has a haze that is at least 10% less than the haze measured on a film of the same thickness and of the same composition, absent the dendritic hydrocarbon polymer modifier, prepared under the same conditions.

15. A film comprising the composition of any of paragraphs 1 to 14, wherein the film has a gauge variation that is at least 10% less than the gauge variation measured on a film of the same thickness and of the same composition, absent the dendritic hydrocarbon polymer modifier, prepared under the same conditions.

16. A film comprising the composition of any of paragraphs 1 to 15, wherein the film has a dart impact strength that is greater than or within 30% less than the dart impact strength measured on a film of the same thickness and of the same composition, absent the dendritic hydrocarbon polymer modifier, prepared under the same conditions.

17. A film comprising the composition of any of paragraphs 1 to 16, wherein the film has an MD Tear strength that is greater than or within 30% less than the MD Tear strength measured on a film of the same thickness and of the same composition, absent the dendritic hydrocarbon polymer modifier, prepared under the same conditions.

18. A film comprising the blend of any of paragraphs 1 to 17, wherein the film has a gauge variation that is at least 10% less than the gauge variation measured on a film of the same thickness and of the same composition, absent the dendritic hydrocarbon polymer modifier, prepared under the same conditions, and the film has a Dart Drop, in g/mil, that within 30% of the Dart Drop measured on a film of the same thickness and of the same composition, absent the dendritic hydrocarbon polymer modifier, prepared under the same conditions.

19. A film comprising the blend of paragraph 11, wherein the film has a gauge variation that is at least 10% less than the gauge variation measured on a film of the same thickness and of the same composition, absent the dendritic hydrocarbon polymer modifier, prepared under the same conditions, and the film has an MD Tear strength that is greater than or within 30% less than the MD Tear strength measured on a film of the same thickness and of the same composition, absent the dendritic hydrocarbon polymer modifier, prepared under the same conditions.

20. A film comprising the blend of any of paragraphs 1 to 19, wherein the blend composition has a strain hardening ratio that is at least 10% greater than the strain hardening ratio measured on a composition, absent the dendritic hydrocarbon polymer modifier, and the film has a Dart Drop, in g/mil, that within 30% of the Dart Drop measured on a film of the same thickness and of the same composition, absent the dendritic hydrocarbon polymer modifier, prepared under the same conditions.

21. A film comprising the blend of any of paragraphs 1 to 20, wherein the film has a gauge variation that is at least 10% less than the gauge variation measured on a film of the same thickness and of the same composition, absent the dendritic hydrocarbon polymer modifier, prepared under the same conditions, and the film has a haze that is at least 10% less than haze measured on a film of the same thickness and of the same composition, absent the dendritic hydrocarbon polymer modifier, prepared under the same conditions.

22. A composition comprising more than 25 wt % (based on the weight of the composition) of one or more ethylene polymers having a $g'_{vis}$ of 0.95 or more, an $M_W$ of 20,000 g/mol or more, and at least 0.1 wt % of a dendritic hydrocarbon polymer modifier where the modifier has a $g'_{vis}$ of less than 0.75, wherein the ethylene polymer has a $g'_{vis}$ of at least 0.20 units higher than the $g'_{vis}$ of the branched modifier.

Test Methods

Melt Index (MI, also referred to as I2) is measured according to ASTM D1238 at 190° C., under a load of 2.16 kg unless otherwise noted. The units for MI are g/10 min or dg/min.

High Load Melt Index (HLMI, also referred to as I21) is the melt flow rate measured according to ASTM D-1238 at 190° C., under a load of 21.6 kg. The units for HLMI are g/10 min or dg/min.

Melt Index Ratio (MIR) is the ratio of the high load melt index to the melt index, or I21/I2.

Density is measured by density-gradient column, as described in ASTM D1505, on a compression-molded specimen that has been slowly cooled to room temperature (i.e., over a period of 10 minutes or more) and allowed to age for a sufficient time that the density is constant within +/−0.001 g/cm$^3$. The units for density are g/cm$^3$.

Gauge, reported in mils, was measured using a Measuretech Series 200 instrument. The instrument measures film thickness using a capacitance gauge. For each film sample, ten film thickness data points were measured per inch of film as the film was passed through the gauge in a transverse direction. From these measurements, an average gauge measurement was determined and reported. Coefficient of variation (Gauge COV) is used to measure the variation of film thickness in the transverse direction. The Gauge COV is defined as a ratio of the standard deviation to the mean of film thickness.

Elmendorf Tear, reported in grams (g) or grams per mil (g/mil), was measured as specified by ASTM D-1922.

Tensile Strength at Yield, Tensile Strength at Break, Ultimate Tensile Strength, and Tensile Strength at 50%, 100%, and/or 200% Elongation were measured as specified by ASTM D-882.

Tensile Peak Load was measured as specified by ASTM D-882.

Tensile Energy, reported in inch-pounds (in-lb), was measured as specified by ASTM D-882.

Elongation at Yield and Elongation at Break, reported as a percentage (%), were measured as specified by ASTM D-882.

1% Secant Modulus (M), reported in pounds per square inch (lb/in$^2$ or psi), was measured as specified by ASTM D-882.

Haze, reported as a percentage (%), was measured as specified by ASTM D-1003.

Gloss, a dimensionless number, was measured as specified by ASTM D-2457 at 45 degrees.

Dart Drop Impact or Dart Drop Impact Strength (DIS), reported in grams (g) and/or grams per mil (g/mil), was measured as specified by ASTM D-1709, method A, unless otherwise specified.

"Melt strength" is defined as the force required to draw a molten polymer extrudate at a rate of 12 mm/s$^2$ and at an extrusion temperature of 190° C. until breakage of the extrudate, whereby the force is applied by take up rollers. The polymer is extruded at a velocity of 0.33 mm/s through an annular die of 2 mm diameter and 30 mm length. Melt strength values reported herein are determined using a Gottfert Rheotens tester and are reported in centi-Newtons (cN). Additional experimental parameters for determining the melt strength are listed in Table 1. For the measurements of melt strength, the resins were stabilized with 500 ppm of Irganox 1076 and 1500 ppm of Irgafos 168.

TABLE 1

Melt Strength test parameters

| | |
|---|---|
| Acceleration | 12 mm/s$^2$ |
| Temperature | 190° C. |
| Piston diameter | 12 mm |
| Piston speed | 0.178 mm/s |
| Die diameter | 2 mm |
| Die length | 30 mm |
| Shear rate at the die | 40.05 s$^{-1}$ |
| Strand length | 100.0 mm |
| Vo (velocity at die exit) | 10.0 mm/s |

Dynamic shear melt rheological data was measured with an Advanced Rheometrics Expansion System (ARES) using parallel plates (diameter=25 mm) in a dynamic mode under nitrogen atmosphere. For all experiments, the rheometer was thermally stable at 190° C. for at least 30 minutes before inserting compression-molded sample of resin onto the parallel plates. To determine the samples' viscoelastic behavior, frequency sweeps in the range from 0.01 to 385 rad/s were carried out at 190° C. under constant strain. Depending on the molecular weight and temperature, strains of 10% and 15% were used and linearity of the response was verified. A nitrogen stream was circulated through the sample oven to minimize chain extension or cross-linking during the experiments. All the samples were compression molded at 190° C. and no stabilizers were added. A sinusoidal shear strain is applied to the material; if the strain amplitude is sufficiently small, the material behaves linearly. It can be shown that the resulting steady-state stress will also oscillate sinusoidally at the same frequency but will be shifted by a phase angle δ with respect to the strain wave. The stress leads the strain by δ. For purely elastic materials δ=0° (stress is in phase with strain) and for purely viscous materials, δ=90° (stress leads the strain by 90° although the stress is in phase with the strain rate). For viscoelastic materials, 0<δ<90. The shear thinning slope (STS) was measured using plots of the logarithm (base ten) of the dynamic viscosity versus logarithm (base ten) of the frequency. The slope is the difference in the log(dynamic viscosity) at a frequency of 100 s$^{-1}$ and the log(dynamic viscosity) at a frequency of 0.01 s$^{-1}$ divided by 4.

The complex shear viscosity (η*) versus frequency (ω) curves were fitted using the Cross model (see, for example, C. W. Macosco, RHEOLOGY: PRINCIPLES, MEASUREMENTS, AND APPLICATIONS, Wiley-VCH, 1994):

$$\eta^* = \frac{\eta_0}{1 + (\lambda\omega)^{1-n}}$$

The three parameters in this model are: $\eta_0$, the zero-shear viscosity; λ, the average relaxation time; and n, the power-law exponent. The zero-shear viscosity is the value at a plateau in the Newtonian region of the flow curve at a low frequency, where the dynamic viscosity is independent of frequency. The average relaxation time corresponds to the inverse of the frequency at which shear-thinning starts. The power-law exponent describes the extent of shear-thinning, in that the magnitude of the slope of the flow curve at high frequencies approaches 1-n on a log(η*)-log(ω) plot. For Newtonian fluids, n=1 and the dynamic complex viscosity is independent of frequency. For the polymers of interest here, n<1, so that enhanced shear-thinning behavior is indicated by a decrease in n (increase in 1-n).

The transient uniaxial extensional viscosity was measured using a SER-2-A Testing Platform available from Xpansion Instruments LLC, Tallmadge, Ohio, USA. The SER Testing Platform was used on a Rheometrics ARES-LS (RSA3) strain-controlled rotational rheometer available from TA Instruments Inc., New Castle, Del., USA. The SER Testing Platform is described in U.S. Pat. Nos. 6,578,413 and 6,691,569, which are incorporated herein for reference. A general description of transient uniaxial extensional viscosity measurements is provided, for example, in "Strain hardening of various polyolefins in uniaxial elongational flow", The Society of Rheology, Inc., J. Rheol. 47(3), 619-630 (2003) and "Measuring the transient extensional rheology of polyethylene melts using the SER universal testing platform", The Society of Rheology, Inc., J. Rheol. 49(3), 585-606 (2005), incorporated herein for reference. Strain hardening occurs when a polymer is subjected to uniaxial extension and the transient extensional viscosity increases more than what is predicted from linear viscoelastic theory. Strain hardening is observed as abrupt upswing of the extensional viscosity in the transient extensional viscosity vs. time plot. A strain hardening ratio (SHR) is used to characterize the upswing in extensional viscosity and is defined as the ratio of the maximum transient extensional viscosity over three times the value of the transient zero-shear-rate viscosity at the same strain. Strain hardening is present in the material when the ratio is greater than 1.

Comonomer content (such as for butene, hexene, and octene) was determined via FTIR measurements according to ASTM D3900 (calibrated versus $^{13}$C NMR). A thin homogeneous film of polymer, pressed at a temperature of about 150° C., was mounted on a Perkin Elmer Spectrum 2000 infrared spectrophotometer. The weight percent of copolymer is determined via measurement of the methyl deformation band at ~1375 cm-1. The peak height of this band is normalized by the combination and overtone band at ~4321 cm-1, which corrects for path length differences.

Peak melting point, Tm, (also referred to as melting point), peak crystallization temperature, Tc, (also referred to as crystallization temperature), glass transition temperature (Tg), heat of fusion (ΔHf or Hf), and percent crystallinity were determined using the following DSC procedure according to ASTM D3418-03. Differential scanning calorimetric (DSC) data were obtained using a TA Instruments model Q200 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes and then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B (Joules/gram)]* 100, where B is the heat of fusion for the 100% crystalline homopolymer of the major monomer component. These values for B are to be obtained from the Polymer Handbook, Fourth Edition, published by John Wiley and Sons, New York 1999, provided; however, that a value of 189 J/g (B) is used as the heat of fusion for 100% crystalline polypropylene, a value of 290 J/g is used for the heat of fusion for 100% crystalline polyethylene. The melting and crystallization temperatures reported here were obtained during the second heating/cooling cycle unless otherwise noted.

For polymers displaying multiple endothermic and exothermic peaks, all the peak crystallization temperatures and peak melting temperatures were reported. The heat of fusion for each endothermic peak was calculated individually. The percent crystallinity is calculated using the sum of heat of fusions from all endothermic peaks. Some of polymer blends produced show a secondary melting/cooling peak overlapping with the principal peak, which peaks are considered together as a single melting/cooling peak. The highest of these peaks is considered the peak melting temperature/crystallization point. For the amorphous polymers, having comparatively low levels of crystallinity, the melting temperature is typically measured and reported during the first heating cycle. Prior to the DSC measurement, the sample was aged (typically by holding it at ambient temperature for a period of 2 days) or annealed to maximize the level of crystallinity.

Unless otherwise stated, polymer molecular weight (weight-average molecular weight, Mw, number-average molecular weight, Mn, and Z-averaged molecular weight, Mz) and molecular weight distribution ($M_w/M_n$) are determined using Size-Exclusion Chromatography. Equipment consists of a High Temperature Size Exclusion Chromatograph (either from Waters Corporation or Polymer Laboratories), with a differential refractive index detector (DRI), an online light scattering detector, and a viscometer. Three Polymer Laboratories PLgel 10 mm Mixed-B columns are used. The nominal flow rate is 0.5 cm$^3$/min and the nominal injection volume is 300 μL. The various transfer lines, columns, and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC.

Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 135° C. The injection concentration can range from 1.0 to 2.0 mg/ml, with lower concentrations being used for higher molecular weight samples.

Prior to running each sample, the DRI detector and the injector are purged. Flow rate in the apparatus is then increased to 0.5 ml/minute, and the DRI allowed to stabilize for 8 to 9 hours before injecting the first sample. The LS laser is turned on 1 to 1.5 hours before running samples.

The concentration, c, at each point in the chromatogram is calculated from the DRI signal after subtracting the prevailing baseline, $I_{DRI}$, using the following equation:

$$c = K_{DRI} I_{DRI}/(dn/dc)$$

where $K_{DRI}$ is a constant determined by calibrating the DRI, and (dn/dc) is the same as described below for the LS analysis. The processes of subtracting the prevailing baseline (i.e., background signal) and setting integration limits that define the starting and ending points of the chromatogram are well known to those familiar with SEC analysis. Units on parameters throughout this description of the SEC method are such that concentration is expressed in g/cm$^3$, molecular weight is expressed in g/mole, and intrinsic viscosity is expressed in dL/g.

The light scattering detector is a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_O = \frac{4\pi^2 n^2 (dn/dc)^2}{\lambda^4 N_A}$$

in which $N_A$ is Avogadro's number, and (dn/dc) is the refractive index increment for the system. The refractive index, n=1.500 for TCB at 135° C. and λ=690 nm. In addition, $A_2$=0.0015 and (dn/dc)=0.104 for polyethylene in TCB at 135° C.; both parameters may vary with average composition of an ethylene copolymer. Thus, the molecular weight determined by LS analysis is calculated by solving the above equations for each point in the chromatogram; together these allow for calculation of the average molecular weight and molecular weight distribution by LS analysis.

A high temperature Viscotek Corporation viscometer is used, which has four capillaries arranged in a Wheatstone bridge configuration with two pressure transducers. One transducer measures the total pressure drop across the detector, and the other, positioned between the two sides of the bridge, measures a differential pressure. The specific viscosity for the solution flowing through the viscometer at each point in the chromatogram, $(\eta_s)_i$, is calculated from the ratio of their outputs. The intrinsic viscosity at each point in the chromatogram, $[\eta]_i$, is calculated by solving the following equation (for the positive root) at each point i:

$$(\eta_s)_i = c_i[\eta]_i + 0.3(c_i[\eta]_i)^2$$

where $c_i$ is the concentration at point i as determined from the DRI analysis.

The branching index ($g'_{vis}$) is calculated using the output of the SEC-DRI-LS-VIS method (described above) as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index g' is defined as:

$$g'_{vis} = \frac{[\eta]_{avg}}{kM_v^\alpha}$$

where the Mark-Houwink parameters k and α are given by k=0.00592, a=0.463. The hydrogenated polybutadiene based modifier can be represented as a butane copolymer for these calculations with 12% butene. $M_V$ is the viscosity-average molecular weight based on molecular weights determined by LS analysis.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001 volume 34(19), pages 6812-6820).

Proton NMR spectra were collected using a 500 MHz Varian pulsed fourier transform NMR spectrometer equipped with a variable temperature proton detection probe operating at 120° C. The polymer sample is dissolved in 1,1,2,2-tetrachloroethane-d2 (TCE-d2) and transferred into a 5 mm glass NMR tube. Typical acquisition parameters are sweep width=10 KHz, pulse width=30 degrees, acquisition time=2 s, acquisition delay=5 s and number of scans=120. Chemical shifts are determined relative to the TCE-d2 signal which is set to 5.98 ppm.

In conducting the $^{13}$C NMR investigations, samples are prepared by adding about 0.3 g sample to approximately 3 g of tetrachloroethane-d2 in a 10 mm NMR tube. The samples are dissolved and homogenized by heating the tube and its contents to 150° C. The data are collected using a Varian spectrometer, with corresponding $^1$H frequencies of either 400 or 700 MHz (in event of conflict, 700 MHz shall be used). The data are acquired using nominally 4000 transients per data file with a about a 10 second pulse repetition delay. To achieve maximum signal-to-noise for quantitative analysis, multiple data files may be added together. The spectral width was adjusted to include all the NMR resonances of interest and FIDs were collected containing a minimum of 32K data points. The samples are analyzed at 120° C. in a 10 mm broad band probe.

Where applicable, the properties and descriptions below are intended to encompass measurements in both the machine and transverse directions. Such measurements are reported separately, with the designation "MD" indicating a measurement in the machine direction, and "TD" indicating a measurement in the transverse direction.

EXAMPLES

The present invention, while not meant to be limited by, may be better understood by reference to the following examples and tables.

Dendritic PE Modifier Synthesis and Hydrogenation ("Modifier-1")

A 30 gallon stainless steel reactor, equipped with a pump around loop, sight glass, and appropriate reagent addition lines, was pressure tested and dried via successive boil-outs with toluene, acetone, and cyclohexane. The reactor was emptied and dried with a nitrogen purge. The reactor was then filled with cyclohexane (80 liters) and charged with a small amount of 2,2'-dipyridyl (0.86 g) and tetrahydrofuran (THF) (2 ml). The reactor was heated to 50° C. and stirring was started. The cyclohexane was titrated slowly with sec-butyl lithium (sec-BuLi) solution (~1.46M in cyclohexane), until a light yellow orange color was observed in the sight glass, indicating that the solvent was dry.

47.28 g (0.168 moles) 1,3-bis(1-phenylethyl)benzene (PEB) was dissolved in 200 ml cyclohexane in a glove box. The PEB solution was pumped into the reactor from the glove box via polyflow tubing attached to an addition port on the reactor. Sec-BuLi solution (208 g) was added incrementally to the reactor and the reaction mixture was monitored by gas chromatography for a complete conversion of the PEB to the di-functional initiator. When initiation was complete, 28.83 g (0.36 mole) tert-butoxylithium (t-BuOLi) was added to the reactor as a solution in cyclohexane. The reactor temperature was reduced to 20° C. and distillation of butadiene was started. The butadiene (1675 g, 30.97 mole) was distilled and fed to the reactor over a 35-40 minute period, then the reactor was pressurized to 8 psig (55.2 kPa) with nitrogen and heated up to 50° C. The reactor was sampled approximately every hour, to determine conversion and collect samples for analysis by GPC. Once complete conversion of the monomer was reached, the linking reagent was added. 12.25 g (0.082 mole) methyltrichlorosilane was slowly added to the reactor as a solution in 250 ml of cyclohexane. The reaction was maintained at 50° C. and samples were taken at hourly intervals to monitor the extent of linking via GPC analysis of the product. About 2.5 hours after the linking reagent was added, the reactor temperature was dropped to 20° C. and the linked PBd (polybutadiene) polymer was removed from the reactor. The polymer was pumped into a nitrogen purged drum, containing a solution of butylated hydroxyl toluene (BHT, 0.335 g) in 40 g of isopropanol. The drum was sealed and stored at room temperature.

The dendritic polybutadiene was chemically hydrogenated to form the dendritic polyethylene modifier. 548 g of dendritic PBd polymer solution in cyclohexane was dried on a rotary evaporator, yielding 14.8 g solid polymer. The resulting polymer solid was dissolved in 1.5 liters of paraxylene under inert atmosphere. This solution was transferred by cannula to an oven-dried glass reactor, fitted with an inert gas purge, condenser, magnetic stirrer, and thermocouple. 280 g of benzenesolufonic acid hydrazide (1.50 mole; 6:1 mole to mole polymer double bond) was added to the reactor, the reactor was closed, heated to 130° C. under inert atmosphere and allowed to react for 6 hours. The hydrogenated polymer was collected by precipitation in methanol and the hydrogenation byproducts were removed by reprecipitation in methanol. The resulting polymer solid was dried to a constant weight in the vacuum over night. Proton NMR of the polymer indicated >99% saturation efficiency. The dendritic PBd polymer can also be hydrogenated catalytically (i.e., supported metal or reduced metal catalyst) to make dendritic PE, given an appropriate reactor, catalyst type and loading and hydrogen gas supply.

Modifier-1 had an Mw of 175,658 g/mol, a Mn of 57,329 g/mol (GPC), a g'$_{vis}$ of 0.62, a melting temperature (Tm) of 94° C., and a heat of fusion of 84.37 J/g. Modifier-1 was made by the assembly method with the number-average molecular weight of the linker of 6,320 g/mol. The assembly method led to a distribution of layer structures. Based on molecular weight fractionation results, Modifier-1 had 41 wt % layer 3, 24 wt % layer 2, and 35 wt % layer 1. (Since the linker Mw was 6,320 g/mol, it is presumed that the average Mw between branch points is about 6320 g/mol.)

Dendritic PE Modifier Blending and Rheological Characterization

Figure 2:
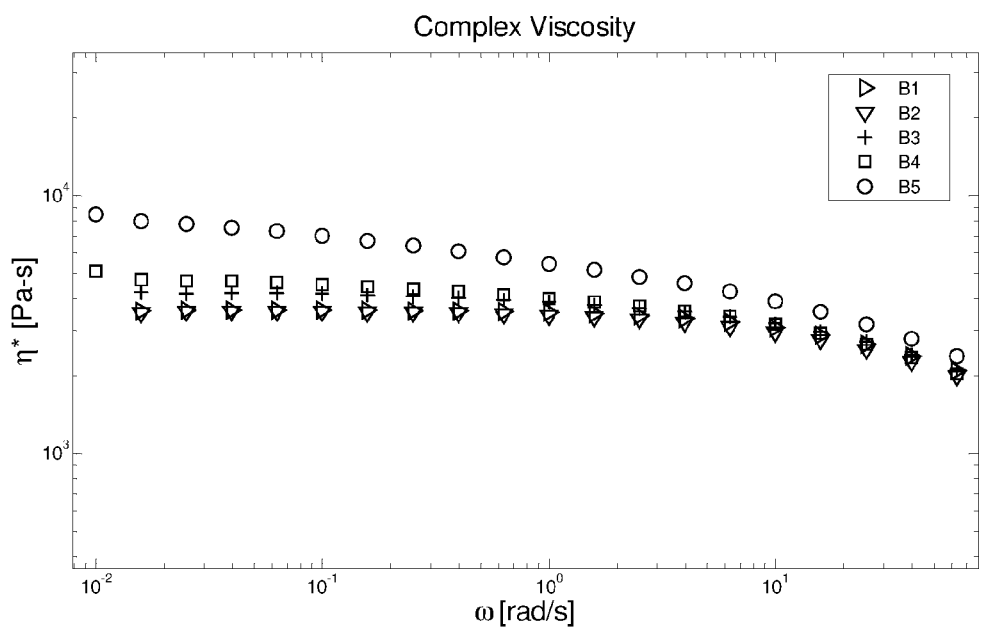
FIG. 2 is a chart of the complex viscosity values of B1, B2, B3, B4, and B5.

The dendritic PE modifier prepared above, Modifier 1, was blended with Exceed™ 2018CA Polyethylene (a linear m-LLDPE, ExxonMobil Chemical Company, Houston Tex., 0.918 g/cc, MI of 2 dg/min, 190° C., 2.16 kg, Mw of about 98,000 g/mol, an Mw/Mn of about 2, a hexene content of about 6.0 wt %, and a CDBI of about 82% to 85%) at 1 wt % to 10 wt % using a DSM twin-screw miniature extrusion mixer running at 180° C. to 185° C., 50 RPM, and for 3 minutes. 0.1 wt % of BHT stabilizer was added in each batch. As listed in Table I, the B1 blend sample is the control Exceed™ 2018CA Polyethylene that was sent through the extrusion mixer without additive for 3 minutes along with 0.1 wt % BHT stabilizer. All blends were compression molded at 190° C. for 10 minutes at 15t to prepare testing plaques. A SER2 (Sentmanat Extensional Rheometer 2) attachment on an ARES rheometer was used to measure the extensional strain hardening of these plaques at 150° C. Strain hardening could be found for all blend samples containing the dendritic PE modifier, as shown in FIG. 1. The shear rheological properties of all blend samples were also examined using an Anton-Paar MCR 501 rheometer in a parallel plate geometry (25 mm diameter) at a controlled strain of 10% at 190° C. Their complex viscosity values are plotted in FIG. 2. A significant increase in shear viscosity can only be found in the B4 and B5 samples, suggesting that the impact on the blend viscosity using a dendritic PE modifier can be minimized for certain applications by keeping the additive concentration below 3 wt %.

A comparative blend of Exceed™ 2018CA PE combined with 5 wt % LDPE (ExxonMobil Chemical Company, Houston, Tex. LD071.LR™ PE, 0.924 g/cc, 0.70 dg/min, 190° C., 2.16 kg) and 0.1 wt % BHT was also prepared under the conditions described above (referred to as Sample B6).

TABLE I

| Sample | Ethylene Polymer | Modifier 1 | Stabilizer (wt %) |
|---|---|---|---|
| B1 | Exceed ™ 2018CA PE* | None | BHT (0.1) |
| B2 | Exceed ™ 2018CA PE* | 1 wt % | BHT (0.1) |
| B3 | Exceed ™ 2018CA PE* | 3 wt % | BHT (0.1) |
| B4 | Exceed ™ 2018CA PE* | 5 wt % | BHT (0.1) |
| B5 | Exceed ™ 2018CA PE* | 10 wt % | BHT (0.1) |
| B6 | LD071.LR ™ PE | 5 wt % | BHT (0.1) |

Blown Film Experiments and Film Properties

Prior to blowing film, the minor component and matrix polyethylene were compounded in a 1 inch Haake twin screw extruder. The Haake twin screw extruder was set at 50 rpm and the melt temperature was targeted at 190° C. The blown film experiments were conducted on a Haake blown film line containing a 1 inch single screw extruder and a 1 inch mono-layer blown film die. The single screw has a Maddock mixing session. The pure resin or the blends were fed into the 1 inch single screw extruder to be melted and homogenized. The molten polymer was pressurized and fed into a 1 inch tubular die. The annular die forms an annular shape with the molten polymer melt with even flow distribution around its circumference. Upon exiting the die lip, two streams of air were introduced to blow the polymer melt into a tubular form, commonly called a bubble, and subsequently to cool the thin film. One stream of air was introduced in the center of the die to inflate the bubble to a certain diameter, or blowup ratio (BUR). The BUR is defined as:

$$BUR = 2 \times L/(\pi \times D)$$

where D is the die diameter and L is the film bubble lay flat width.

For all the experiments, the BUR is the same and is set at 2.5. The film gauge is 1.5 mil.

Another cooling air flows from the outside of the die from the tubular air ring. The tube or bubble collapsed after reaching the two up-nip rollers. The nip rollers are driven by a motor with varied speeds. The film was solidified prior to reach the up-nip rollers. The film was collected after passing through the up-nip rollers. The thickness of the film is controlled by speed of the nip rollers. The specific process conditions are listed in Table II.

TABLE II

Blown Film Process Conditions

| | | Sample | | | |
|---|---|---|---|---|---|
| | | B1 | B2 | B3 | B6 |
| Gauge | mil | 1.5 | 1.5 | 1.5 | 1.5 |
| BUR | | 2.5 | 2.5 | 2.5 | 2.5 |
| Extrusion Condition | Units | | | | |
| Zone #1 | ° C. | 190 | 190 | 190 | 190 |
| Zone #2 | ° C. | 195 | 195 | 195 | 195 |
| Zone #3 | ° C. | 190 | 190 | 190 | 190 |
| Die (Zone #5) | ° C. | 185 | 185 | 185 | 185 |
| Extruder Speed | rpm | 33 | 33 | 33 | 33 |
| Line Speed | % | 45 | 45 | 45 | 45 |

The film properties and the process data are shown in Table III. The 1% and 3% dendritic blends produce films with the excellent optics. The total haze value is reduced from 43% for Exceed™ 2018 PE to 6-7% range for the blends. One of the blown film processability measurements is the film gauge variation as measured by the coefficient of variation (COV). The 1% and 3% blends all show lower gauge COV compared to Exceed™ 2018 PE. The 1% blend also retains the good dart impact strength, in comparison to Exceed™ 2018 PE. Although the 5% LD071.LR blend improved the gauge COV and optical properties, the dart impact strength was reduced significantly. The present invention is also an improvement over prior art US2011/0118420, where the addition of HDPE modifier improved optical properties but reduced the impact strength.

TABLE III

Film Properties

| | Sample | | | |
|---|---|---|---|---|
| | B1 | B6 | B2 | B3 |
| 1% Secant (psi) MD | 25986 | 28940 | 26032 | 25115 |
| 1% Secant (psi) TD | 23729 | 28503 | 29820 | 28609 |
| Tensile | | | | |
| Yield Strength(psi) MD | 1212 | 1304 | 1292 | 1256 |
| Yield Strength(psi) TD | 1211 | 1369 | 1424 | 1323 |
| Elongation @ Yield (%) MD | 6 | 6 | 6 | 6 |
| Elongation @ Yield (%) TD | 5 | 6 | 7 | 5 |
| Tensile Strength (psi) MD | 8437 | 7564 | 7612 | 6688 |
| Tensile Strength (psi) TD | 7647 | 7326 | 7846 | 7255 |
| Elongation @ Break (%) MD | 686 | 697 | 665 | 636 |
| Elongation @ Break (%) TD | 677 | 664 | 658 | 654 |
| Elmendorf Tear MD (gms/mil) | 338 | 259 | 313 | 314 |
| Total Haze (%) ASTM D1003 | 43.2 | 16.7 | 5.8 | 6.9 |

TABLE III-continued

Film Properties

|  | Sample | | | |
| --- | --- | --- | --- | --- |
|  | B1 | B6 | B2 | B3 |
| Dart Drop, Phenolic, Method A (gms/mil) | 410 | 230 | 463 | 245 |
| Gauge COV | 12.5% | 7.1% | 6.8% | 7.3% |
| Die Pressure [PSI] | 3068 | 2933 | 3086 | 3118 |
| Motor Load [Nm] | 45.4 | 36.5 | 47.6 | 49.3 |
| Extruder Output [g/min] | 15.0 | 14.8 | 15.3 | 15.0 |
| strain hardening ratio** | 1.0 | 3.3 | 3.4 | 7.9 |
| Complex Shear Viscosity* (Pas) | 3590 | 3893 | 3551 | 4168 |

*measured at a frequency of 0.1 rad/sec and a temperature of 190° C.
**when the extensional viscosity is measured at a strain rate of 1 sec$^{-1}$ and at a temperature of 150° C.

It was also noted that the 100% Exceed™ 2018 PE bubble is unstable, while the bubble with greater than 1% addition of dendritic PE is stable and so is the control blend with LDPE.

All documents described herein are incorporated by reference herein for purposes of all jurisdictions where such practice is allowed, including any priority documents, related applications, and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

The invention claimed is:

1. A polyethylene blend comprising one or more ethylene polymers and one or more dendritic polybutadiene modifiers, wherein the modifier has: 1) a g'$_{vis}$ value less than 0.75; 2) a Cayley tree topology with a layer number of 2 or more, 3) an average Mw of 1500 g/mole or more between branch points, and 4) a Mw from 50,000 to 2,000,000 g/mol; wherein the complex viscosity at 0.1 sec$^{-1}$ of the modifier is equal to or greater than the complex viscosity at 0.1 sec$^{-1}$ of the polyethylene prior to combination with the modifier.

2. The composition of claim 1, wherein the modifier has 5 wt % or less of xylene insoluble material, and/or at least 0.6 ppm of silicon.

3. The composition of claim 1, wherein the modifier is present at 0.25 wt % to 20 wt %, based upon the weight of the blend.

4. The composition of claim 1, wherein the polyethylene comprises a copolymer of ethylene and one or more $C_3$ to $C_{20}$ alphaolefins and has an $M_w$ of 20,000 to 1,000,000 g/mol.

5. The composition of claim 1, wherein the polyethylene has a density of 0.87 to 0.96 g/cm$^3$.

6. The composition of claim 1, wherein the modifier is present from 0.1 wt % to 5 wt %, (based upon the weight of the blend); and the polyethylene has a composition distribution breadth index of 60% or more and a density of 0.90 g/cm$^3$ or more.

7. The composition of claim 1, wherein the modifier has a strain-hardening ratio of 2 or more and the blend has a strain hardening ratio of greater than 1.0.

8. A polyethylene film comprising the blend of claim 1, said film having a gauge variation that is at least 10% lower than that of a film of the same thickness and of the same composition, absent the modifier, prepared under the same conditions and a dart impact strength that is within 20% of a film of the same thickness and of the same composition, absent the modifier, prepared under the same conditions.

9. A polyethylene film comprising the blend of claim 1, said film having a gauge variation that is at least 10% lower than that of a film of the same thickness and of the same composition, absent the modifier, prepared under the same conditions and a MD Tear strength that is within 20% of a film of the same thickness and of the same composition, absent the modifier, prepared under the same conditions.

10. A polyethylene film comprising the blend of claim 1, said film having a haze that is at least 10% lower than that of film of the same thickness and of the same composition, absent the modifier, prepared under the same conditions and a dart impact strength that is within 20% of a film of the same thickness and of the same composition, absent the modifier, prepared under the same conditions.

11. A polyethylene film comprising the blend of claim 1, said film having a haze that is at least 10% lower than that of film of the same thickness and of the same composition, absent the modifier, prepared under the same conditions and a MD Tear strength that is within 20% of a film of the same thickness and of the same composition, absent the modifier, prepared under the same conditions.

12. A film comprising the composition of claim 1, said film having a haze of 10% or less.

13. A film comprising the composition of claim 1, wherein the film has a haze that is at least 10% less than the haze measured on a film of the same thickness and of the same composition, absent the dendritic hydrocarbon polymer modifier, prepared under the same conditions.

14. A film comprising the composition of claim 1, wherein the film has a gauge variation that is at least 10% less than the gauge variation measured on a film of the same thickness and of the same composition, absent the dendritic hydrocarbon polymer modifier, prepared under the same conditions.

15. A film comprising the composition of claim 1, wherein the film has a dart impact strength that is greater than or within 30% less than the dart impact strength measured on a film of the same thickness and of the same composition, absent the dendritic hydrocarbon polymer modifier, prepared under the same conditions.

16. A film comprising the composition of claim 1, wherein the film has an MD Tear strength that is greater than or within 30% less than the MD Tear strength measured on a film of the same thickness and of the same composition, absent the dendritic hydrocarbon polymer modifier, prepared under the same conditions.

17. A film comprising the blend of claim 1, wherein the film has a gauge variation that is at least 10% less than the gauge variation measured on a film of the same thickness and of the same composition, absent the dendritic hydrocarbon polymer modifier, prepared under the same conditions, and the film has a Dart Drop, in g/mil, that within 30% of the Dart Drop measured on a film of the same thickness and of the same composition, absent the dendritic hydrocarbon polymer modifier, prepared under the same conditions.

18. A film comprising the blend of claim 10, wherein the film has a gauge variation that is at least 10% less than the gauge variation measured on a film of the same thickness and of the same composition, absent the dendritic hydrocarbon polymer modifier, prepared under the same conditions, and the film has an MD Tear strength that is greater than or within 30% less than the MD Tear strength measured on a film of the same thickness and of the same composition, absent the dendritic hydrocarbon polymer modifier, prepared under the same conditions.

19. A film comprising the blend of claim 1, wherein the blend composition has a strain hardening ratio that is at least 10% greater than the strain hardening ratio measured on a composition, absent the dendritic hydrocarbon polymer modifier, and the film has a Dart Drop, in g/mil, that is within 30% of the Dart Drop measured on a film of the same thickness and of the same composition, absent the dendritic hydrocarbon polymer modifier, prepared under the same conditions.

20. A film comprising the blend of claim 1, wherein the film has a gauge variation that is at least 10% less than the gauge variation measured on a film of the same thickness and of the same composition, absent the dendritic hydrocarbon polymer modifier, prepared under the same conditions, and the film has a haze that is at least 10% less than haze measured on a film of the same thickness and of the same composition, absent the dendritic hydrocarbon polymer modifier, prepared under the same conditions.

21. A composition of claim 1, comprising more than 25 wt % (based on the weight of the composition) of one or more ethylene polymers having a $g'_{vis}$ of 0.95 or more and an $M_w$ of 20,000 g/mol or more and at least 0.1 wt % of a dendritic polybutadiene modifier.

22. The composition of claim 1, wherein the modifier has at least 0.6 ppm of silicon.

* * * * *